United States Patent
Oya et al.

(10) Patent No.: US 10,066,108 B2
(45) Date of Patent: Sep. 4, 2018

(54) COMPOSITION INCLUDING FLUORINE-CONTAINING POLYMER COMPRISING AT LEAST ONE TYPE OF GROUP SELECTED FROM GROUP COMPRISING POLYMERIZABLE FUNCTIONAL GROUPS AND CROSS-LINKABLE FUNCTIONAL GROUPS; AND COATED ARTICLE

(71) Applicant: DAIKIN INDUSTRIES, LTD., Osaka-shi, Osaka (JP)

(72) Inventors: Akiko Oya, Settsu (JP); Tomohiro Yoshida, Settsu (JP); Kakeru Hanabusa, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 290 days.

(21) Appl. No.: 14/909,355

(22) PCT Filed: Jul. 31, 2014

(86) PCT No.: PCT/JP2014/070279
§ 371 (c)(1),
(2) Date: Feb. 1, 2016

(87) PCT Pub. No.: WO2015/016329
PCT Pub. Date: Feb. 5, 2015

(65) Prior Publication Data
US 2016/0168389 A1    Jun. 16, 2016

(30) Foreign Application Priority Data

Aug. 2, 2013 (JP) ................................ 2013-161811
Sep. 20, 2013 (JP) ................................ 2013-195979
Feb. 28, 2014 (JP) ................................ 2014-038925

(51) Int. Cl.
C09D 5/08 (2006.01)
C09D 127/12 (2006.01)
(Continued)

(52) U.S. Cl.
CPC .............. *C09D 4/06* (2013.01); *C08F 290/12* (2013.01); *C08F 290/126* (2013.01);
(Continued)

(58) Field of Classification Search
USPC ....................................................... 525/281
See application file for complete search history.

(56) References Cited

U.S. PATENT DOCUMENTS

2007/0265454 A1   11/2007   Miyata et al.
2009/0123742 A1    5/2009   Vandermeulen et al.
(Continued)

FOREIGN PATENT DOCUMENTS

CN     103857751 A    6/2014
JP     10-337954 A    12/1998
(Continued)

OTHER PUBLICATIONS

Patrick Glockner et al., "Synthesis and Rheological Behavior of Cross-Linkable Poly[N-(methacryl-2-ethyl)-N-(3-amino(1,2,4-triazole-2-yl))urea-co-methyl methacrylate]" Macromolecules, 2002, pp. 2050-2054, vol. 35, No. 6.
(Continued)

*Primary Examiner* — Ramsey E Zacharia
(74) *Attorney, Agent, or Firm* — Sughrue Mion, PLLC

(57) ABSTRACT

The present invention aims to provide a composition capable of forming a coat which has a good effect of preventing corrosion of metal and is excellent in adhesiveness with metal, transparency, and insulation. The composition of the present invention includes a fluoropolymer having at least one group selected from the group consisting of polymer-
(Continued)

izable functional groups and cross-linkable functional groups, and a nitrogen-containing aromatic heterocyclic compound having a polymerizable functional group.

15 Claims, 2 Drawing Sheets

(51) Int. Cl.
*C09D 151/00* (2006.01)
*C08F 259/08* (2006.01)
*C08F 290/04* (2006.01)
*C08F 290/12* (2006.01)
*C09D 4/06* (2006.01)
*C08L 101/02* (2006.01)
*C09D 127/18* (2006.01)
*C08F 220/38* (2006.01)

(52) U.S. Cl.
CPC .............. *C08L 101/02* (2013.01); *C09D 5/08* (2013.01); *C09D 127/18* (2013.01); *C08F 259/08* (2013.01); *C08F 290/04* (2013.01); *C08F 2220/385* (2013.01); *C09D 127/12* (2013.01); *C09D 151/003* (2013.01)

(56) References Cited

U.S. PATENT DOCUMENTS

| | | |
|---|---|---|
| 2011/0039975 A1 | 2/2011 | Hara et al. |
| 2013/0034735 A1 | 2/2013 | Hayashi et al. |
| 2013/0046053 A1 | 2/2013 | Hayashi et al. |
| 2014/0287200 A1 | 9/2014 | Ito et al. |

FOREIGN PATENT DOCUMENTS

| | | |
|---|---|---|
| JP | 2002-212444 A | 7/2002 |
| JP | 2006-151967 A | 6/2006 |
| JP | 2007-523894 A | 8/2007 |
| JP | 2007-231072 A | 9/2007 |
| JP | 2009-534540 A | 9/2009 |
| JP | 2011-189562 A | 9/2011 |
| JP | 2011-190299 A | 9/2011 |
| JP | 2011-190315 A | 9/2011 |
| JP | 2012-77225 A | 4/2012 |
| JP | 2013-523881 A | 6/2013 |
| JP | 2015-178484 A | 10/2015 |
| WO | 2005/075441 A1 | 8/2005 |
| WO | 2009/145234 A1 | 12/2009 |
| WO | 2011/130032 A1 | 10/2011 |
| WO | 2013/051831 A2 | 4/2013 |
| WO | 2013/115195 A1 | 8/2013 |
| WO | 2015/016330 A1 | 2/2015 |

OTHER PUBLICATIONS

International Search Report for PCT/JP2014/070279 dated Oct. 28, 2014.
International Search Report for PCT/JP2014/070280 dated Sep. 9, 2014.
International Preliminary Report on Patentability issued from the International Bureau in counterpart International Application No. PCT/JP2014/070279, dated Feb. 2, 2016.

- 51
- 52
- 53
- 54
- 55

- 61
- 62
- 63
- 64
- 65
- 66
- 67
- 68

COMPOSITION INCLUDING FLUORINE-CONTAINING POLYMER COMPRISING AT LEAST ONE TYPE OF GROUP SELECTED FROM GROUP COMPRISING POLYMERIZABLE FUNCTIONAL GROUPS AND CROSS-LINKABLE FUNCTIONAL GROUPS; AND COATED ARTICLE

CROSS REFERENCE TO RELATED APPLICATIONS

This application is a National Stage of International Application No. PCT/JP2014/070279 filed Jul. 31, 2014, claiming priority based on Japanese Patent Application Nos. 2013-161811 filed Aug. 2, 2013, 2013-195979 filed Sep. 20, 2013, and 2014-038925 filed Feb. 28, 2014, the contents of all of which are incorporated herein by reference in their entirety.

TECHNICAL FIELD

The present invention relates to a composition comprising a fluoropolymer having at least one group selected from the group consisting of polymerizable functional groups and cross-linkable functional groups, and a coated article.

BACKGROUND ART

Various techniques of forming a coat on the surface of metal are known for the purpose of preventing corrosion of metal or preventing stains.

Patent Literature 1 discloses perfluoropolyether benzotriazole compounds and compositions containing perfluoropolyether benzotriazole compounds. It also discloses that the perfluoropolyether benzotriazole compounds can be attached to a metal substrate to provide at least one of the following characteristics: anti-soiling, anti-staining, ease of cleaning, repellency, hydrophobicity, or oleophobicity.

Patent Literature 2 discloses that a copolymer synthesized from a structural unit of such a monomer as 1-vinyl imidazole can provide corrosion-control coats.

Electronic devices include circuit boards provided with conductive lines formed of metal coats. However, the metal coats are brought into contact with water or corrosive gas and are eroded, so that the conductivity thereof degrades. Further, optical devices such as light-emitting diodes suffer discoloration due to corrosion of metal coats, so that the brightness thereof degrades. In order to solve these problems, various methods of preventing corrosion of metal coats by forming a coat on metal films are known.

For example, Patent Literature 3 discloses a coating composition for sealing conductive parts such as conductive lines, electric contacts, and electric wires of traffic signals or lighting apparatus to provide characteristics such as water resistance, insulation, durability, and resistance to decomposition due to ultraviolet rays, essentially consisting of a fluoropolymer which is soluble in a solvent and has a molecular weight of 10,000 or higher, and a solvent which dissolves the fluoropolymer.

CITATION LIST

Patent Literature

Patent Literature 1: JP 2007-523894 T
Patent Literature 2: JP 2009-534540 T
Patent Literature 3: JP 2007-231072 A

SUMMARY OF INVENTION

Technical Problem

Unfortunately, coats formed from fluoropolymers are insufficient in adhesiveness with substrates.

In consideration of the above situation, the present invention aims to provide a composition capable of forming a coat which has a good effect of preventing corrosion of metal and is excellent in adhesiveness with metal, transparency, and insulation.

Solution to Problem

The present invention relates to a composition comprising: a fluoropolymer having at least one group selected from the group consisting of polymerizable functional groups and cross-linkable functional groups; and a nitrogen-containing aromatic heterocyclic compound having a polymerizable functional group.

The fluoropolymer preferably comprises a polymerization unit based on a monomer having at least one group selected from the group consisting of polymerizable functional groups and cross-linkable functional groups, and the at least one group selected from the group consisting of polymerizable functional groups and cross-linkable functional groups is preferably at least one selected from the group consisting of a carbon-carbon double bond, a hydroxy group (excluding the hydroxy group contained in a carboxyl group), a carboxyl group, and an amino group.

The nitrogen-containing aromatic heterocyclic compound is preferably a compound represented by the following formula (1) or the following formula (2):

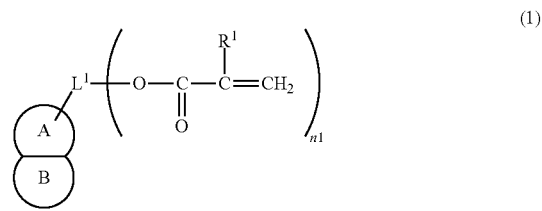

wherein the ring A represents a substituted or unsubstituted 5- or 6-membered nitrogen-containing aromatic heterocycle; $R^1$ represents a hydrogen atom, a halogen atom, or a $C_{1-6}$ alkyl group; n1 is an integer of 1 to 6; $L^1$ represents a linking group having a valency of n1+1 and having a bond represented by —CO—NH—, —CO—O—, —O—CO—NH—, or —NH—CO—NH—; and the ring B represents a substituted or unsubstituted aromatic ring;

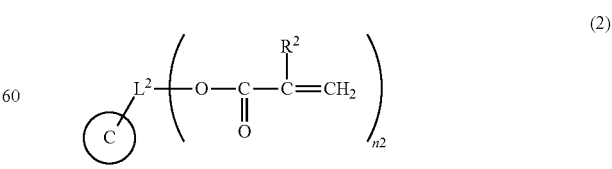

wherein the ring C represents a substituted or unsubstituted 5- or 6-membered nitrogen-containing aromatic heterocycle; $R^2$ represents a hydrogen atom, a halogen atom, or a $C_{1-6}$ alkyl group; n2 is an integer of 1 to 6; and $L^2$ represents a linking group having a valency of n2+1 and having a bond represented by —CO—NH—, —CO—O—, —O—CO—NH—, or —NH—CO—NH—.

In the formula (1), the ring A is preferably a 5-membered nitrogen-containing aromatic heterocycle having two or three nitrogen atoms.

In the formula (1), $L^1$ is preferably represented by the following formula (3):

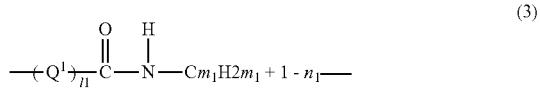

(3)

wherein Q represents —O— or —NH—; l1 is 0 or 1; m1 is an integer of 1 to 20; and n1 is an integer of 1 to 6, if m1 is 1, n1 is an integer of 1 to 3, and if m1 is 2, n1 is an integer of 1 to 5.

In the formula (1), the ring B is preferably an aromatic ring substituted with a hydroxy group, an amino group, a carboxylic acid group, a nitro group, a halogen group, a thiol group, a cyano group, an acyl group, a sulfonic acid group, a mesyl group, an alkyl group, or a substituent represented by the following formula (4):

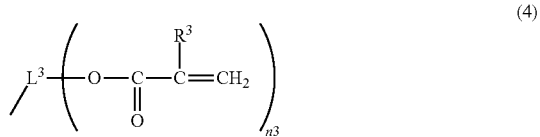

(4)

wherein $L^3$ represents a linking group having a valency of n3+1 and having a bond represented by —CO—NH—, —CO—O—, —O—CO—NH—, or —NH—CO—NH—; $R^3$ represents a hydrogen atom, a halogen atom, or a $C_{1-6}$ alkyl group; and n3 is an integer of 1 to 6.

In the formula (1), the ring B is preferably a benzene ring.

In the formula (2), the ring C is preferably a 5-membered nitrogen-containing aromatic heterocycle having two or three nitrogen atoms.

In the formula (2), $L^2$ is preferably represented by the following formula (5):

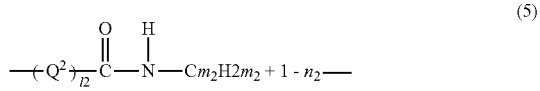

(5)

wherein $Q^2$ represents —O— or —NH—; l2 is 0 or 1; m2 is an integer of 1 to 20; and n2 is an integer of 1 to 6, if m2 is 1, n2 is an integer of 1 to 3, and if m2 is 2, n2 is an integer of 1 to 5.

The composition of the present invention preferably further comprises an acrylic component (A).

The composition of the present invention is preferably a coating material. The composition is more preferably an anti-corrosive coating material.

The present invention also relates to a coated article comprising a substrate and a coat formed from the above composition on the substrate. The substrate is preferably formed from a metal.

The present invention also relates to a sheet formed from the above composition.

The present invention also relates to a laminated sheet comprising a release sheet and a sheet formed from the above composition on the release sheet.

Advantageous Effects of Invention

The composition of the present invention is capable of forming a coat which has a good effect of preventing corrosion of metal and is excellent in adhesiveness with metal. The resulting coat is also excellent in transparency.

The coated article of the present invention is less likely to suffer corrosion of its substrate even if the substrate is formed from a metal, is excellent in adhesiveness between the coat and the substrate, and has high transparency of the coat.

The sheet of the present invention has a good effect of preventing corrosion of metal and is excellent in adhesiveness with metal. The sheet is also excellent in transparency.

DESCRIPTION OF EMBODIMENTS

Figure 1:
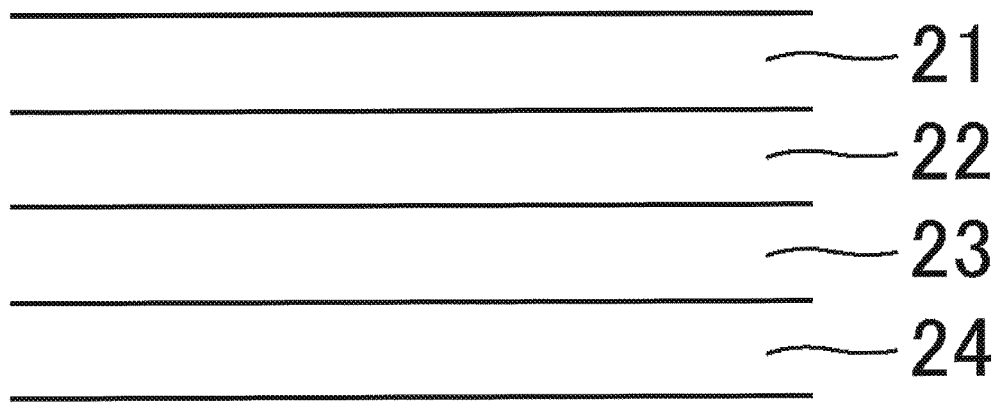
FIG. 1 shows one example of the lamination structure including a coat formed from the composition of the present invention, and the sheet and the laminated sheet of the present invention.

The present invention will be described in detail below.

The composition of the present invention comprises a fluoropolymer having at least one group selected from the group consisting of polymerizable functional groups and cross-linkable functional groups and a nitrogen-containing aromatic heterocyclic compound having a polymerizable functional group.

The composition of the present invention is capable of forming a coat or a sheet which has a good effect of preventing corrosion of metal and is excellent in adhesiveness with metal. The resulting coat or sheet is also excellent in transparency.

Further, the coat or sheet formed from the composition of the present invention can suppress occurrence of migration to various conductive parts such as conductive parts of printed circuit boards and multilayer substrates, electrodes of connectors, silver or copper patterns, and conductive films of silver or copper mesh. The migration is a phenomenon in which, when water attaches to a conductive part of an electronic device and a silver conductive part or a copper conductive part are brought into contact with the water so that a voltage is applied between the adjacent conductive parts, the metal ions migrate from the anode to the cathode and the metal deposits on the cathode. In some conditions, accidents such as short circuit between conductive parts may occur. In particular, silver and copper are known as metals that easily cause migration.

Examples of the nitrogen-containing aromatic heterocyclic compound having a polymerizable functional group include those prepared by substituting part of a compound represented by the formula (7) or (11) to be mentioned later with an organic group containing a polymerizable functional group.

Examples of the polymerizable functional group in the nitrogen-containing aromatic heterocyclic compound having a polymerizable functional group include a carbon-carbon double bond, a vinyl group, a vinyloxy group, an allyl group, a (meth)acryloyl group, a maleoyl group, a styryl group, and a cinnamoyl group. The polymerizable functional group is preferably a carbon-carbon double bond.

The nitrogen-containing aromatic heterocyclic compound having a polymerizable functional group is preferably a compound represented by the following formula (1) or (2).
(Compounds Represented by the Formula (1) or (2))
1. Compounds Represented by the Formula (1)

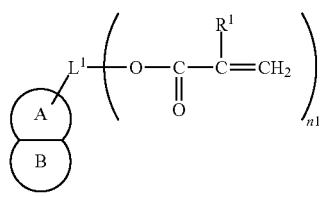
(1)

In the formula (1), the ring A represents a substituted or unsubstituted 5- or 6-membered nitrogen-containing aromatic heterocycle; $R^1$ represents a hydrogen atom, a halogen atom, or a $C_{1-6}$ alkyl group; n1 is an integer of 1 to 6; $L^1$ represents a linking group having a valency of n1+1 and having a bond represented by —CO—NH—, —CO—O—, —O—CO—NH—, or —NH—CO—NH—; and the ring B represents a substituted or unsubstituted aromatic ring.

In the formula (1), the moiety represented by the following formula:

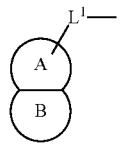

is preferably a moiety represented by the following formula:

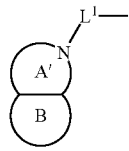

wherein the ring A' represents a substituted or unsubstituted 5- or 6-membered nitrogen-containing aromatic heterocycle.

In the formula (1), the ring A is preferably a 5-membered nitrogen-containing aromatic heterocycle having two or three nitrogen atoms, more preferably an imidazole ring, a pyrazole ring, or a triazole ring.

In the formula (1), the moiety represented by the following formula:

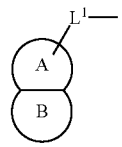

is more preferably a moiety represented by the following formula:

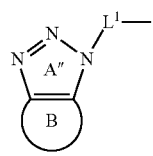

wherein the ring A" may be substituted.

In the formula (1), $L^1$ is preferably represented by the following formula (3):

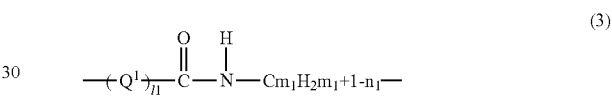
(3)

wherein $Q^1$ represents —O— or —NH—; l1 is 0 or 1; m1 is an integer of 1 to 20; and n1 is an integer of 1 to 6, if m1 is 1, n1 is an integer of 1 to 3, and if m1 is 2, n1 is an integer of 1 to 5. In the formula, m1 is preferably 1 or 2, and l1 is preferably 0.

In the formulas (1) and (3), n1 is preferably 1 or 2.

In the formula (1), the ring B may be an aromatic ring substituted with a hydroxy group, an amino group, a carboxylic acid group, a nitro group, a halogen group, a thiol group, a cyano group, an acyl group, a sulfonic acid group, a mesyl group, an alkyl group, or a substituent represented by the formula (4):

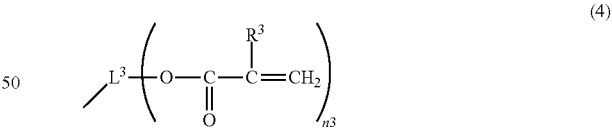
(4)

wherein $L^3$ represents a linking group having a valency of n3+1 and having a bond represented by —CO—NH—, —CO—O—, —O—CO—NH—, or —NH—CO—NH—; $R^3$ represents a hydrogen atom, a halogen atom, or a $C_{1-6}$ alkyl group; and n3 is an integer of 1 to 6.

In the formula (4), $L^3$ is preferably represented by the following formula (6):

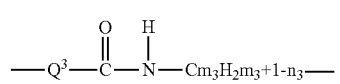
(6)

wherein $Q^3$ represents —O— or —NH—; m3 is an integer of 1 to 20; and n3 is an integer of 1 to 6. In the formula, m3 is preferably 1 or 2.

In the formulas (4) and (6), n3 is preferably 1 or 2.

In the formula (1), the ring B is preferably a benzene ring.

In the formula (1), the moiety represented by the following formula:

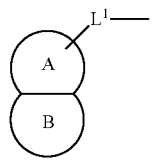

is still more preferably a moiety represented by any of the following formulas:

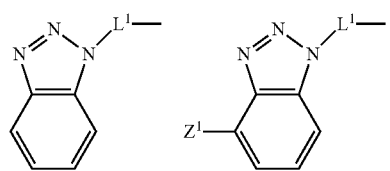

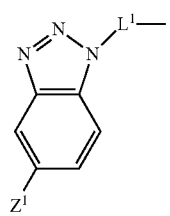

wherein $Z^1$ represents a hydroxy group, an amino group, a carboxylic acid group, a nitro group, a halogen group, a thiol group, a cyano group, an acyl group, a sulfonic acid group, a mesyl group, an alkyl group, or a substituent represented by the formula (4). $Z^1$ is preferably a hydroxy group, an amino group, or a substituent represented by the formula (4).

2. Method of Producing Compound Represented by the Formula (1)

The compound represented by the formula (1) may be produced by reacting a compound represented by the following formula (7) and a compound represented by the following formula (8).

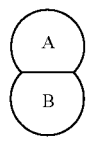
(7)

In the formula (7), the ring A represents a substituted or unsubstituted 5- or 6-membered nitrogen-containing aromatic heterocycle, and the ring B represents a substituted or unsubstituted aromatic ring.

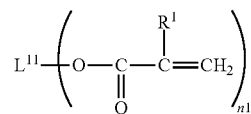
(8)

In the formula (8), $L^{11}$ represents a functional group reactive with a hydroxy group or an amino group; and $R^1$ and n1 are the same as $R^1$ and n1 mentioned above in the formulas (1) and (3). The amino group may be a secondary amine (—NH—) in the nitrogen-containing aromatic heterocycle.

The compound represented by the formula (7) is preferably a compound represented by the following formula.

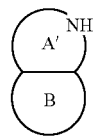

It is more preferably any of the compounds represented by the following formulas.

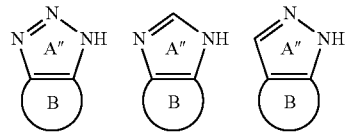

It is still more preferably any of the compounds represented by the following formulas.

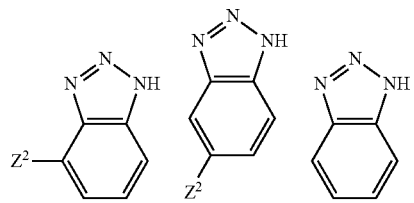

It is particularly preferably any of the compounds represented by the following formulas.

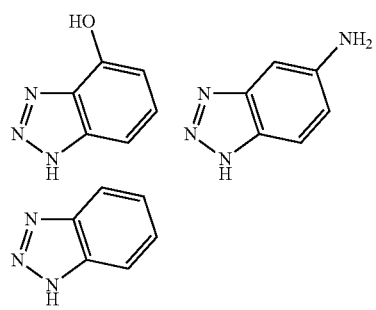

The ring A' represents a substituted or unsubstituted 5- or 6-membered nitrogen-containing aromatic heterocycle. The ring A" may be substituted. $Z^2$ represents a hydroxy group, an amino group, a carboxylic acid group, a nitro group, a halogen group, a thiol group, a cyano group, an acyl group, a sulfonic acid group, a mesyl group, or an alkyl group, and preferably a hydroxy group or an amino group.

The compound represented by the formula (8) is preferably an isocyanate compound represented by the following formula (9):

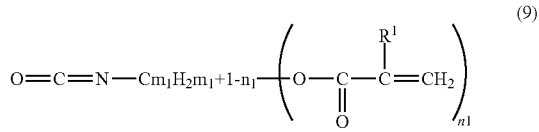

wherein m1, n1, and $R^1$ are the same as m1, n1, and $R^1$ mentioned above in the formulas (1) and (3).

The compound represented by the formula (8) is more preferably any of the compounds represented by the following formulas.

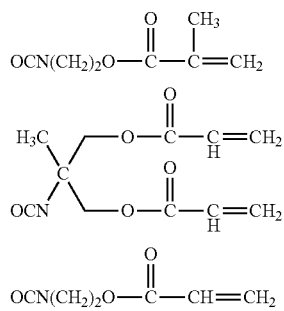

The two compounds, i.e., the compound represented by the formula (7) and the compound represented by the formula (8) are preferably added to and reacted in the system such that the amount of the compound represented by the formula (8) is 0.1 to 5 mol for 1 mol of the compound represented by the formula (7).

Even 0.1 to 1 mol of the compound represented by the formula (8) for 1 mol of the compound represented by the formula (7) is enough to cause a reaction between the compound represented by the formula (7) and the compound represented by the formula (8).

Even if $Z^2$ is a hydroxy group or an amino group, 0.1 to 1 mol of the compound represented by the formula (8) for 1 mol of the compound represented by the formula (7) causes a selective reaction between the ring A of the compound represented by the formula (7) and the compound represented by the formula (8).

If $Z^2$ is a hydroxy group or an amino group and the two compounds are added to the system such that the amount of the compound represented by the formula (8) is more than 1 mol for 1 mol of the compound represented by the formula (7), the compound represented by the formula (8) reacts with not only the ring A of the compound represented by the formula (7) but also a hydroxy group or an amino group of the ring B. This enables production of a compound represented by the formula (1) in which the moiety represented by the following formula:

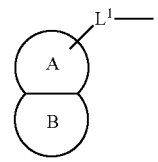

is either of the moieties represented by the following formulas:

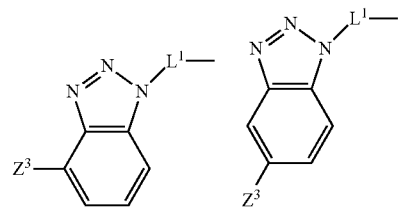

wherein $Z^3$ is a substituent represented by the formula (4).

The reaction between the compound represented by the formula (7) and the compound represented by the formula (8) may be allowed to proceed at 15° C. to 100° C., preferably 15° C. to 70° C., more preferably 20° C. to 30° C. The reaction time is usually 1 to 10 hours.

The reaction between the compound represented by the formula (7) and the compound represented by the formula (8) may be allowed to proceed in the presence of a catalyst. Examples of the catalyst include organotitanium compounds such as tetraethyl titanate and tetrabutyl titanate; organotin compounds such as tin octylate, dibutyltin oxide, and dibutyltin dilaurate; and tin(II) halides such as tin(II) chloride and tin(II) bromide. The catalyst may be used in any appropriately adjusted amount. For example, the amount thereof is usually about 0.00001 to 3 parts by mass, preferably about 0.0001 to 1 part by mass, for 100 parts by mass of the compound represented by the formula (8).

The reaction between the compound represented by the formula (7) and the compound represented by the formula (8) may be allowed to proceed in a solvent. The solvent may be any solvent that does not hinder the progress of the reaction, and may be a conventionally known solvent that is usually used. Examples thereof include ketone-type solvents such as acetone, methyl isobutyl ketone (MIBK), and methyl ethyl ketone (MEK); ester-type solvents such as ethyl acetate and butyl acetate; and fluorine-containing solvents such as HCFC225 (a mixture of $CF_3CF_2CHCl_2$/$CClF_2CF_2CHClF$). Alcohol-type solvents having an OH group are not preferred because they hinder the progress of the reaction. If the system contains water, the progress of the reaction is hindered. Thus, the solvent is more preferably dehydrated before use.

3. Compounds Represented by the Formula (2)

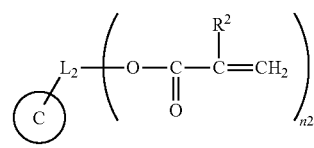

In the formula (2), the ring C represents a substituted or unsubstituted 5- or 6-membered nitrogen-containing aromatic heterocycle; $R^2$ represents a hydrogen atom, a halogen atom, or a $C_{1-6}$ alkyl group; n2 is an integer of 1 to 6; $L^2$ represents a linking group having a valency of n2+1 and having a bond represented by —CO—NH—, —CO—O—, —O—CO—NH—, or —NH—CO—NH—.

In the formula (2), the moiety represented by the following formula:

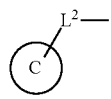

is preferably a moiety represented by the following formula:

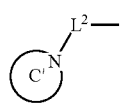

wherein the ring C' is a substituted or unsubstituted 5- or 6-membered nitrogen-containing aromatic heterocycle.

In the formula (2), the ring C and the ring C' are each preferably a substituted or unsubstituted 5-membered nitrogen-containing aromatic heterocycle having two or three nitrogen atoms.

In the formula (2), the moiety represented by the following formula:

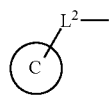

is more preferably any of the moieties represented by the following formulas.

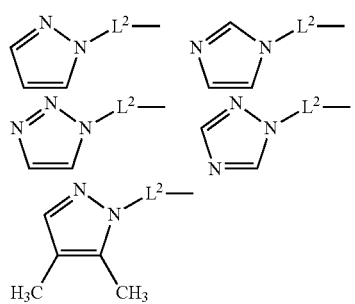

In the formula (2), $L^2$ is preferably represented by the following formula (5):

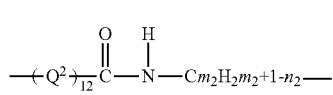

(5)

wherein $Q^2$ represents —O— or —NH—; 12 is 0 or 1; m2 is an integer of 1 to 20; and n2 is an integer of 1 to 6. In the formula, m2 is preferably 1 or 2; and 12 is preferably 0.

In the formulas (2) and (5), n2 is preferably 1 or 2.

4. Method of Producing Compound Represented by the Formula (2)

The compound represented by the formula (2) may be produced by reacting a compound represented by the following formula (11) and a compound represented by the following formula (12).

(11)

The ring C represents a substituted or unsubstituted 5- or 6-membered nitrogen-containing aromatic heterocycle.

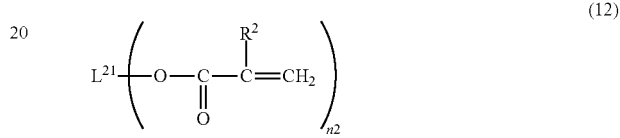

(12)

In the formula (12), $L^{21}$ represents a functional group reactive with a hydroxy group or an amino group; and $R^2$ and n2 are the same as $R^2$ and n2 mentioned above in the formulas (2) and (5). The amino group may be a secondary amine (—NH—) in the nitrogen-containing aromatic heterocycle.

The compound represented by the formula (11) is preferably a compound represented by the following formula:

and more preferably any of the compounds represented by the following formulas:

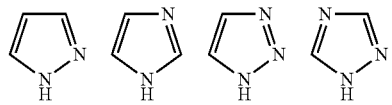

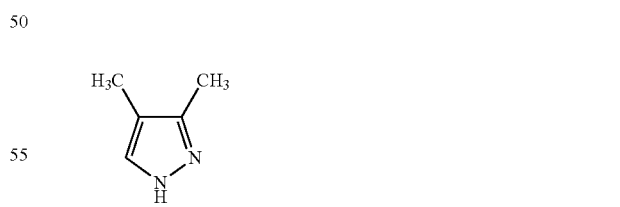

wherein the ring C' is a substituted or unsubstituted 5- or 6-membered nitrogen-containing aromatic heterocycle. The ring C and the ring C' are each preferably a substituted or unsubstituted 5-membered nitrogen-containing aromatic heterocycle having two or three nitrogen atoms.

The compound represented by the formula (12) is preferably an isocyanate compound represented by the following formula (13):

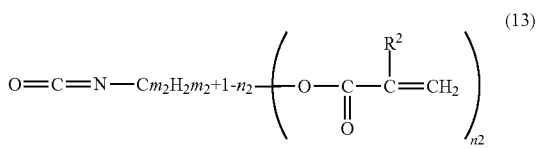

(13)

wherein m2, n2, and $R^2$ are the same as m2, n2, and $R^2$ mentioned above in the formulas (2) and (5).

The compound represented by the formula (12) is more preferably any of the compounds represented by the following formulas.

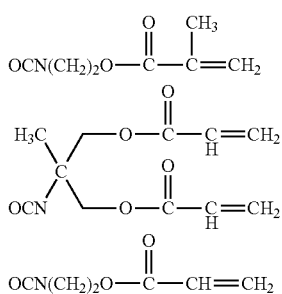

The two compounds, i.e., the compound represented by the formula (11) and the compound represented by the formula (12) are preferably added to and reacted in the system such that the amount of the compound represented by the formula (12) is 0.1 to 5 mol for 1 mol of the compound represented by the formula (11).

The reaction between the compound represented by the formula (11) and the compound represented by the formula (12) may be allowed to proceed at 15° C. to 100° C., preferably 15° C. to 70° C., more preferably 20° C. to 30° C. The reaction time is usually 1 to 10 hours.

The reaction between the compound represented by the formula (11) and the compound represented by the formula (12) may be allowed to proceed in the presence of a catalyst. Examples of the catalyst include organotitanium compounds such as tetraethyl titanate and tetrabutyl titanate; organotin compounds such as tin octylate, dibutyltin oxide, and dibutyltin dilaurate; and tin(II) halides such as tin(II) chloride and tin(II) bromide. The catalyst may be used in any appropriately adjusted amount. For example, the amount thereof is usually about 0.00001 to 3 parts by mass, preferably about 0.0001 to 1 part by mass, for 100 parts by mass of the compound represented by the formula (12).

The reaction between the compound represented by the formula (11) and the compound represented by the formula (12) may be allowed to proceed in a solvent. The solvent may be any solvent that does not hinder the progress of the reaction, and may be a conventionally known solvent that is usually used. Examples thereof include ketone-type solvents such as acetone, methyl isobutyl ketone (MIBK), and methyl ethyl ketone (MEK); ester-type solvents such as ethyl acetate and butyl acetate; and fluorine-containing solvents such as HCFC225 (a mixture of $CF_3CF_2CHCl_2$/$CCF_2CF_2F_2CHClF$). Alcohol-type solvents having an OH group are not preferred because they hinder the progress of the reaction. If the system contains water, the progress of the reaction is hindered. Thus, the solvent is more preferably dehydrated before use.

In order to form a coat excellent in an effect of preventing corrosion and in adhesiveness, and to prevent occurrence of migration, the composition of the present invention preferably contains 0.1 to 30% by mass, more preferably 1 to 10% by mass of the nitrogen-containing aromatic heterocyclic compound having a polymerizable functional group.

In order to form a coat excellent in an effect of preventing corrosion and in adhesiveness, and to prevent occurrence of migration, the amount of the nitrogen-containing aromatic heterocyclic compound having a polymerizable functional group is still more preferably 2% by mass or more, particularly preferably 3% by mass or more.

(Fluoropolymer Having at Least One Group Selected from the Group Consisting of Polymerizable Functional Groups and Cross-Linkable Functional Groups)

The composition of the present invention comprises a fluoropolymer having at least one group selected from the group consisting of polymerizable functional groups and cross-linkable functional groups. The fluoropolymer usually contains a polymerization unit based on a monomer having at least one group selected from the group consisting of polymerizable functional groups and cross-linkable functional groups.

Examples of the polymerizable functional groups include a carbon-carbon double bond, a vinyl group, a vinyloxy group, an allyl group, a (meth)acryloyl group, a maleoyl group, a styryl group, and a cinnamoyl group.

Examples of the cross-linkable functional groups include a hydroxy group (excluding the hydroxy group contained in a carboxyl group; the same shall apply to the following), a carboxyl group, an amino group, and a silyl group.

The at least one group selected from the group consisting of polymerizable functional groups and cross-linkable functional groups is preferably at least one selected from the group consisting of a carbon-carbon double bond, a hydroxy group (excluding the hydroxy group contained in a carboxyl group; the same shall apply to the following), a carboxyl group, a group represented by —COOCO—, a cyano group, an amino group, an epoxy group, and a silyl group, more preferably at least one selected from the group consisting of a carbon-carbon double bond, a hydroxy group, a carboxyl group, a group represented by —COOCO—, an amino group, a cyano group, and a silyl group, still more preferably at least one selected from the group consisting of a carbon-carbon double bond, a hydroxy group, a carboxyl group, an amino group, and a silyl group, particularly preferably at least one selected from the group consisting of a carbon-carbon double bond, a hydroxy group, a carboxyl group, and an amino group, further more preferably at least one selected from the group consisting of a carbon-carbon double bond, a hydroxy group, and a carboxyl group.

The fluoropolymer preferably has the at least one group selected from the group consisting of polymerizable functional groups and cross-linkable functional groups at a main chain end or a side chain, more preferably at a side chain, of a polymer constituting the fluoropolymer.

The carbon-carbon double bond is preferably a reactive group represented by —CX=$CH_2$ (wherein X represents H, Cl, F, $CH_3$, or $CF_3$).

The reactive group is in an amount of preferably 1 to 50 mol, more preferably 10 mol or more and 30 mol or less, of the fluoropolymer.

The fluoropolymer having at least one group selected from the group consisting of polymerizable functional groups and cross-linkable functional groups is preferably formed from at least one fluoropolymer selected from the group consisting of the fluoropolymers (A), (B), and (C) to be mentioned later, more preferably at least one fluoropolymer selected from the group consisting of the fluoropolymers (A) and (B).

(Fluoropolymer (A))

The fluoropolymer (A) has a structural unit (hereinafter, also referred to as a "structural unit L") represented by the following formula (L):

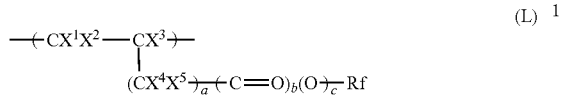

wherein $X^1$ and $X^2$ are the same as or different from each other, and each represent H or F; $X^3$ represents H, F, $CH_3$, or $CF_3$; $X^4$ and $X^5$ are the same as or different from each other, and each represent H, F, or $CF_3$; Rf represents a $C_{1-40}$ organic fluorohydrocarbon group which may have an amide bond or a urea bond, or a $C_{2-100}$ organic fluorohydrocarbon group which has an ether bond and which may have an amide bond, a carbonate bond, a urethane bond, or a urea bond, in which one to three hydrogen atoms are replaced by Y (Y represents a $C_{2-10}$ monovalent organic group having an ethylenic carbon-carbon double bond at an end); a is an integer of 0 to 3; b and c are the same as or different from each other, and are each 0 or 1). The ether bond is a divalent group represented by —O—. The amide bond is a divalent group represented by —CONH—. The carbonate bond is a divalent group represented by —O—COO—. The urethane bond is a divalent group represented by —O—CONH—. The urea bond is a divalent group represented by —NH—CONH—.

The "hydrocarbon group" herein means an organic group consisting of carbon and hydrogen. The "fluorohydrocarbon group" herein means a hydrocarbon group in which part or all of the hydrogen atoms are replaced by fluorine atoms. Examples of the "hydrocarbon group" include alkyl groups, allyl groups, cycloalkyl groups, and unsaturated alkyl groups. Examples of the "fluorohydrocarbon group" include fluoroalkyl groups, fluoroallyl groups, fluorocycloalkyl groups, and unsaturated fluoroalkyl groups.

Y may have a ketone bond (—CO—), an ether bond, or an ester bond (—COO—).

The structural unit L is preferably a structural unit L1 represented by the following formula (L1):

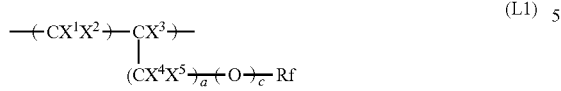

wherein $X^1$, $X^2$, $X^3$, $X^4$, $X^5$, Rf, a, and c are the same as mentioned above.

A fluoropolymer (A) containing this structural unit L1 is preferred in that it particularly has a low refractive index, it gives high transparency to the resulting coat, and it has good adhesiveness with various substrates and is capable of improving the adhesiveness durability. Such a fluoropolymer is preferred also in that it is capable of improving the curing reactivity in contact with heat, radical, or cation.

A more preferred specific example of the structural unit L1 is a structural unit L2 derived from a fluorine-containing ethylenic monomer represented by the following formula (L2):

wherein Rf is the same as mentioned above.

This structural unit L2 is preferred in that it has a low refractive index and is capable of improving the transparency of the resulting coat, and excellently has good adhesiveness with various substrates and is capable of improving the adhesiveness durability. This unit is also preferred in that it is well copolymerizable with any other fluorine-containing ethylenic monomer. Further, this unit is preferred also in that it is capable of not only improving the near-infrared transparency but also reducing the refractive index.

In one preferable embodiment, Rf in the structural unit L2 is —$(CF(CF_3)CF_2—O)_n$—$CH_2O$—(CO)—$CF=CH_2$, for example.

Another preferred specific example of the structural unit L1 is a structural unit L3 derived from a fluorine-containing ethylenic monomer represented by the following formula (L3):

wherein Rf is the same as mentioned above.

This structural unit L3 is preferred in that it has a low refractive index, and excellently has good adhesiveness with various substrates and is capable of improving the adhesiveness durability. This unit is also preferred in that it is well copolymerizable with any other fluorine-containing ethylenic monomers. Further, this unit is preferred also in that it is capable of not only improving the near-infrared transparency but also reducing the refractive index.

As mentioned above, Rf in the structural units L, L1, L2, and L3 is a $C_{1-40}$ organic fluorohydrocarbon group which may have an amide bond or a urea bond, or a $C_{2-100}$ organic fluorohydrocarbon group which has an ether bond and which may have an amide bond, a carbonate bond, a urethane bond, or a urea bond, in which one to three hydrogen atoms are replaced by Y (Y represents a $C_{2-10}$ monovalent organic group having an ethylenic carbon-carbon double bond at an end).

In the $C_{1-40}$ organic fluorohydrocarbon group which may have an amide bond or a urea bond, or the $C_{2-100}$ organic fluorohydrocarbon group which has an ether bond and which may have an amide bond, a carbonate bond, a urethane bond, or a urea bond, the upper limit of the carbon number thereof is preferably 30, more preferably 20, particularly preferably 10.

In one preferred embodiment, Rf is $Rf^2$ to be mentioned below. The carbon-carbon double bond in $Y^2$ to be mentioned later has an ability to cause reactions such as polycondensation and is capable of providing a cured (cross-linked) product. Specifically, when brought into contact with a radical or cation, the carbon-carbon double bond causes a polymerization reaction or condensation reaction between the fluoropolymer molecules, thereby providing a cured (cross-linked) product.

The structural unit L in which Rf is $Rf^2$ (which is a $C_{1-40}$ organic fluorohydrocarbon group which may have an amide bond or a urea bond, or a $C_{2-100}$ organic fluorohydrocarbon group which has an ether bond and which may have an amide bond, a carbonate bond, a urethane bond, or a urea bond, in which one to three hydrogen atoms are replaced by $Y^2$ ($Y^2$ represents a $C_{2\text{-}10}$ monovalent organic group having an ethylenic carbon-carbon double bond at an end)) is hereinafter also referred to as a structural unit N. The structural units L1, L2, and L3 in which Rf is $Rf^2$ are also referred to as structural units N1, N2, and N3, respectively.

$Rf^2$ is preferably represented by the following 1.5 formula ($Rf^2$):

 (Rf²)

wherein -D- is a fluoroether unit represented by the following formula (D):

 (D)

(wherein n is an integer of 0 to 20; R is a $C_{1\text{-}5}$ divalent fluoroalkylene group in which at least one hydrogen atom is replaced by a fluorine atom, and if n is two or greater, Rs may be the same as or different from each other); and $Ry^2$ is a $C_{1\text{-}39}$ organic hydrocarbon group which may have an amide bond or a urea bond and in which part or all of the hydrogen atoms may be replaced by fluorine atoms, or a $C_{1\text{-}99}$ organic hydrocarbon group which has an ether bond and may have an amide bond, a carbonate bond, a urethane bond, or a urea bond, and in which part or all of the hydrogen atoms may be replaced by fluorine atoms, and in each of which one to three hydrogen atoms are replaced by $Y^2$ ($Y^2$ is the same as mentioned above).

$Ry^2$ is preferably a $C_{1\text{-}39}$ organic hydrocarbon group which may optionally have an amide bond, a carbonate bond, a urethane bond, a urea bond, or an ether bond and in which part or all of the hydrogen atoms are optionally replaced by fluorine atoms and one to three hydrogen atoms are replaced by $Y^2$ ($Y^2$ is the same as mentioned above).

R represents a $C_{1\text{-}5}$ divalent fluoroalkylene group having at least one fluorine atom. Thereby, it is capable of, for example, more reducing the viscosity of the compound than those having a conventional fluorine-free alkoxyl group or an alkylene ether unit. Further, such a group contributes to improvement of the heat resistance, reduction in the refractive index, and improvement of the solubility to general-purpose solvents, for example.

Specific examples of the unit —(O—R)— or —(R—O)— as the unit -D- include —(OCF$_2$CF$_2$CF$_2$)—, —(CF$_2$CF$_2$CF$_2$O)—, —(OCFQ$^4$CF$_2$)—, —(CFQ$^4$CH$_2$O)—, —(CFQCF$_2$O)—, —(OCF$_2$CFQ$^4$)—, —(OCFQ$^5$)—, —(CFQ$^5$O)—, —(OCH$_2$CF$_2$CF$_2$)—, (OCF$_2$CF$_2$CH$_2$)—, —(OCH$_2$CH$_2$CF$_2$)—, —(OCF$_2$CH$_2$CH$_2$)—, —(CH$_2$CF$_2$CF$_2$O)—, —(OCF$_2$CF$_2$CF$_2$CF$_2$)—, —(CF$_2$CF$_2$CF$_2$CF$_2$O)—, —(OCFQ$^5$CH$_2$)—, —(CH$_2$CFQ$^5$O)—, —(OCH(CH$_3$)CF$_2$CF$_2$)—, —(OCF$_2$CF$_2$CH(CH$_3$))—, —(OCQ$^6$$_2$)— and —(CQ$^6$$_2$O)— (wherein $Q^4$ and $Q^5$ are the same as or different from each other, and each represent H, F, or CF$_3$; $Q^6$ represents CF$_3$). The unit -D- is preferably a repeating unit of one or two or more of these units.

In particular, the unit -D- is preferably a repeating unit of one or two or more of the units selected from —(OCFQ$^4$CF$_2$)—, —(OCF$_2$CF$_2$CF$_2$)—, —(OCH$_2$CF$_2$CF$_2$)—, —(OCFQ$^5$)—, —(OCQ$^6$$_2$)—, —(CFQ$^4$CF$_2$O)—, —(CFQ$^4$CH$_2$O)—, —(CF$_2$CF$_2$CF$_2$O)—, —(CH$_2$CF$_2$CF$_2$O)—, —(CFQ$^5$O)—, and —(CQ$^6$$_2$O)—, more preferably a repeating unit of one or two or more of the units selected from —(OCFQ$^4$CF$_2$)—, —(OCF$_2$CF$_2$CF$_2$)—, —(OCH$_2$CF$_2$CF$_2$)—, —(CFQ$^4$CF$_2$O)—, —(CFQ$^4$CH$_2$O)—, —(CF$_2$CF$_2$CF$_2$O)—, and —(CH$_2$CF$_2$CF$_2$O)—, still more preferably a repeating unit of one or two or more of the units selected from —(OCFQ$^4$CF$_2$)—, —(OCF$_2$CF$_2$CF$_2$)—, —(CFQ$^4$CF$_2$O)—, —(CFQ$^4$CH$_2$O)—, and —(CF$_2$CF$_2$CF$_2$O)—. If the structural unit L is the structural unit L2, -D- preferably satisfies that R is at least one selected from the group consisting of —(CFQ$^4$CF$_2$O)—, —(CFQ$^4$CH$_2$O)—, —(CF$_2$CF$_2$CF$_2$O)—, and —(CH$_2$CF$_2$CF$_2$O)—, more preferably at least one selected from the group consisting of —(CFQ$^4$CF$_2$O)—, —(CFQ$^4$CH$_2$O)—, and —(CF$_2$CF$_2$CF$_2$O)—. In the above formulas, $Q^4$ represents H, F, or CF$_3$. $Q^4$ is preferably CF$_3$.

Here, the fluoroether unit -D- and $Rf^2$ are free from a structural unit —OO— (specifically, —R—O—O—R—, —O—O—R—, —R—O—O—, and the like).

A first preferred example of $Y^2$ is one represented by the following formula:

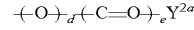

wherein $Y^{2a}$ is a $C_{2\text{-}5}$ alkenyl group or fluoroalkenyl group having an ethylenic carbon-carbon double bond at an end; and d and e are the same as or different from each other, and are each 0 or 1.

$Y^{2a}$ is preferably one represented by the following formula:

$$-CX^6=CX^7X^8$$

wherein $X^6$ represents H, F, CH$_3$, or CF$_3$; $X^7$ and $X^8$ are the same as or different from each other, and each represent H or F. This group is preferred in that it has high curing reactivity in contact with a radical or cation.

Specifically, those represented by the following formulas:

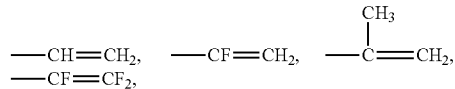

may be mentioned as examples of preferred $Y^{2a}$.

$Y^2$ is more preferably one represented by the following formula:

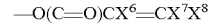

wherein $X^6$ represents H, F, CH$_3$, or CF$_3$; $X^7$ and $X^8$ are the same as or different from each other, and each represent H or F. Such a group is preferred in that it has high curing reactivity especially in contact with a radical, and is preferred in that it easily provides a coat by, for example, photo-curing.

Specifically, those represented by the following formulas:

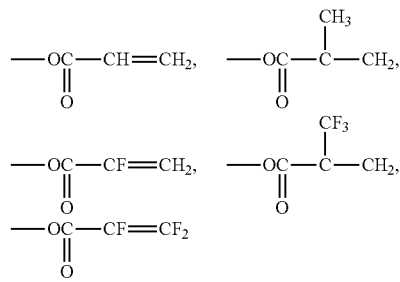

may be mentioned as specific more preferable examples of $Y^2$.

Specifically, those represented by the following formulas:

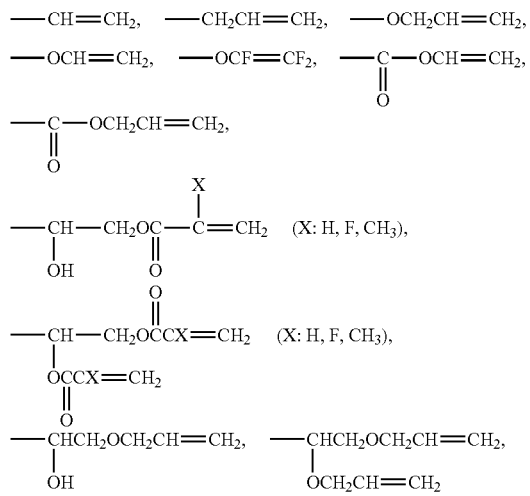

may be mentioned as other preferable examples of $Y^2$.

In particular, $Y^2$ is preferably one having the structure represented by $-O(C=O)CF=CH_2$ because such $Y^2$ is capable of improving the near-infrared transparency, and has particularly high curing (cross-linking) reactivity and is capable of efficiently providing a coat.

The organic group $Y^2$ having a carbon-carbon double bond in a side chain may be introduced to an end of the polymer main chain.

In the fluoropolymer used in the present invention, the $-Rf^{2a}-$ group (the group obtained by removing $Y^2$ from $-Rf^2$) in the structural units N, N1, N2, and N3 is a $C_{1-40}$ divalent fluorohydrocarbon group which may have an amide bond or a urea bond, or a $C_{2-100}$ divalent fluorohydrocarbon group which has an ether bond and which may have an amide bond, a carbonate bond, a urethane bond, or a urea bond. This $-Rf^{2a}-$ has only to satisfy that a fluorine atom is bonded to a carbon atom contained therein, and is generally a divalent fluorohydrocarbon group in which a fluorine atom and a hydrogen atom or chlorine atom are bonded to a carbon atom, or a divalent fluorohydrocarbon group having an ether bond. The group preferably contains fluorine atoms as many as possible (i.e., has a high fluorine content), more preferably it is a divalent perfluoroalkylene group or a divalent perfluorohydrocarbon group having an ether bond. The fluorine content in the fluoropolymer is 25% by mass or more, preferably 40% by mass or more. This leads to not only an increase in the near-infrared transparency of the fluoropolymer (A), but also a decrease in the refractive index thereof. The above fluorine content is particularly preferred in that it leads to an increase in the near-infrared transparency or makes it possible to maintain a low refractive index even if the degree of curing (cross-linking density) is increased so as to improve the heat resistance and elastic modulus of the resulting coat.

Too high a carbon number of the $-Rf^{2a}-$ group is not preferred because the solubility to a solvent may be deteriorated or the transparency may be deteriorated in the case of divalent fluorohydrocarbon groups, or the hardness and mechanical properties of the polymer itself or of the resulting coat may be deteriorated in the case of divalent fluorohydrocarbon groups having an ether bond. The carbon number of the divalent fluorohydrocarbon group is preferably 1 to 20, more preferably 1 to 10. The carbon number of the divalent fluorohydrocarbon group having an ether bond is preferably 2 to 30, more preferably 2 to 20.

Specifically, those represented by the following formulas:

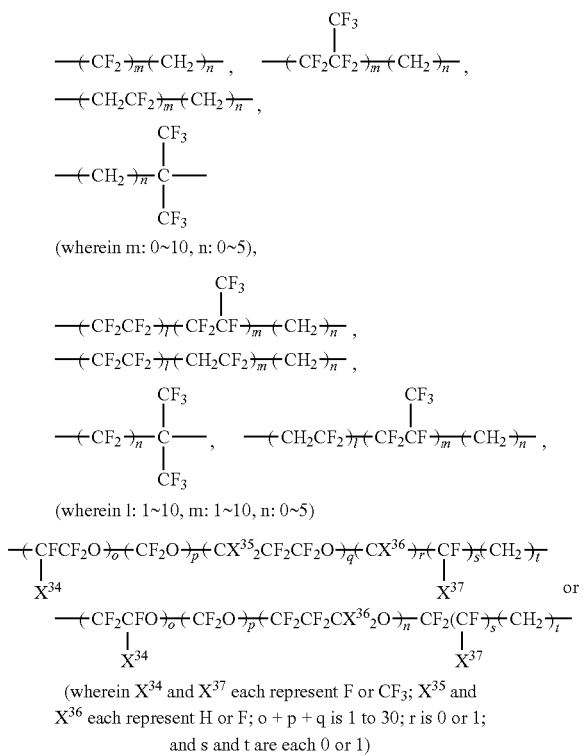

(wherein $X^{34}$ and $X^{37}$ each represent F or $CF_3$; $X^{35}$ and $X^{36}$ each represent H or F; $o+p+q$ is 1 to 30; r is 0 or 1; and s and t are each 0 or 1)

may be mentioned as examples of preferred $-Rf^{2a}-$.

The structural unit N constituting the fluoropolymer (A) used in the present invention is preferably a structural unit N1. The structural unit N1 is preferably a structural unit N2 or a structural unit N3. Then, the following will describe specific examples of the structural unit N2 and the structural unit N3.

Specific examples of a preferred monomer constituting the structural unit N2 include those represented by the following formulas:

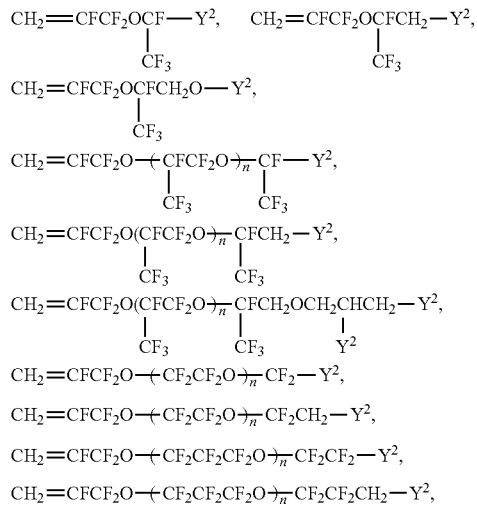

-continued

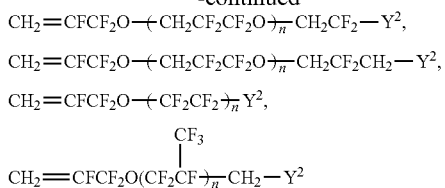

wherein n is an integer of 1 to 30; and $Y^2$ is the same as mentioned above.

More specific examples thereof include those represented by the following formulas:

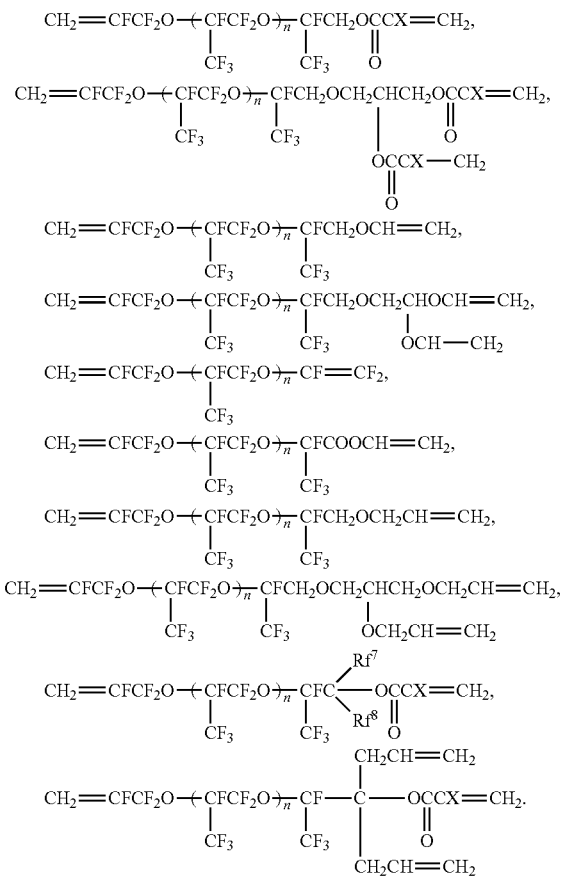

wherein $Rf^7$ and $Rf^8$ each represent a $C_{1-5}$ perfluoroalkyl group; n is an integer of 0 to 30; and X represents H, $CH_3$, F, or $CF_3$.

Specific examples of a preferred monomer constituting the structural unit N3 include those represented by the following formulas:

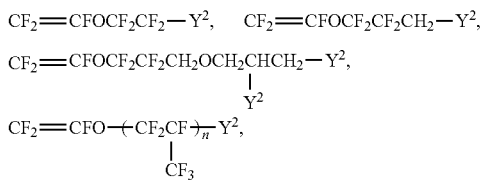

-continued

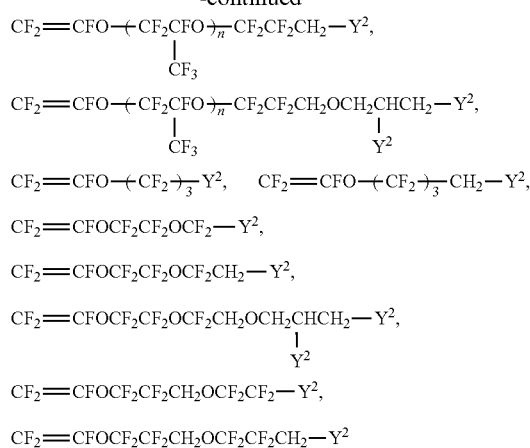

wherein $Y^2$ is the same as mentioned above; and n is an integer of 1 to 30.

More specific examples thereof include those represented by the following formulas:

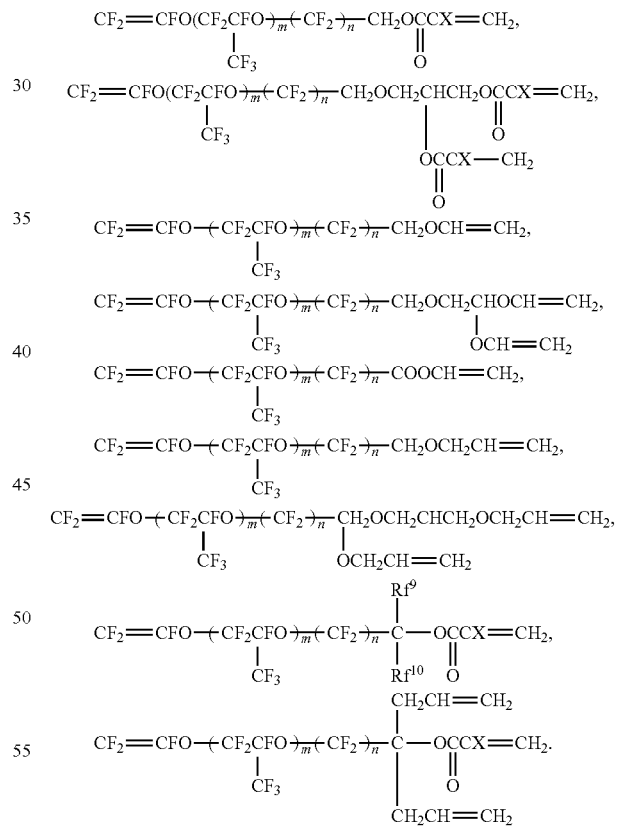

wherein $Rf^9$ and $Rf^{10}$ each represent a $C_{1-5}$ perfluoroalkyl group; m is an integer of 0 to 30; n is an integer of 1 to 3; and X represents H, $CH_3$, F, or $CF_3$.

In addition to these structural units N2 and N3, specific examples of any other preferred monomer constituting the structural unit N of the fluoropolymer (A) include those represented by the following formulas:

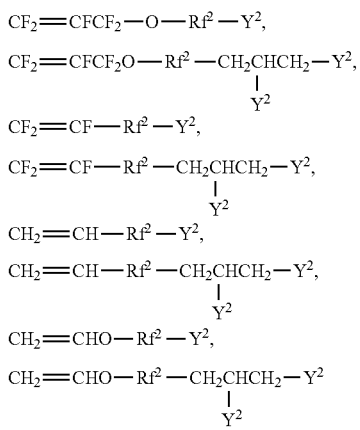

wherein $Y^2$ and $Rf^2$ are the same as mentioned above.

More specific examples thereof include those represented by the following formulas:

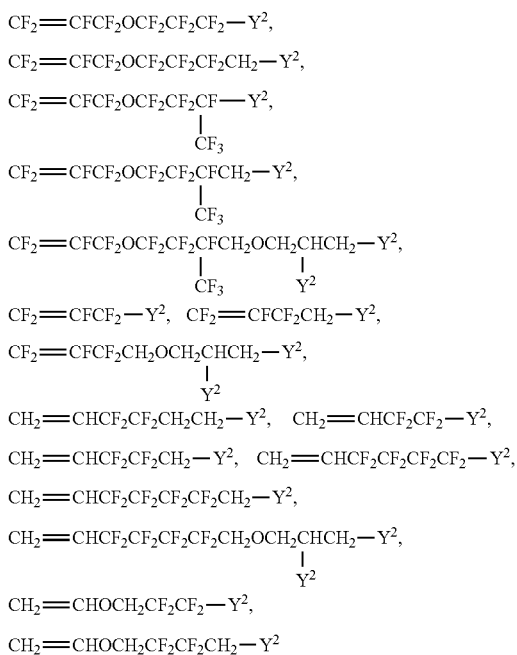

wherein $Y^2$ is the same as mentioned above.

If the fluoropolymer (A) is a copolymer, the proportion of the structural unit L has only to be 0.1 mol % or more in all the structural units constituting the fluoropolymer (A). In order to provide a coat high in hardness and excellent in abrasion resistance and scratch resistance, as well as chemical resistance and solvent resistance by curing (cross-linking), the proportion thereof is 2 mol % or more, preferably 5 mol % or more, more preferably 10 mol % or more.

In particular, for applications which require formation of a coat excellent in heat resistance, transparency, and low water absorption, the proportion thereof is 10 mol % or more, preferably 20 mol % or more, more preferably 30 mol % or more, particularly preferably 40 mol % or more. The proportion of the structural unit L is preferably 100 mol % or less, more preferably less than 100 mol %, in all the structural units constituting the fluoropolymer (A).

The molecular weight of the fluoropolymer (A) may be chosen from the range of 500 to 1,000,000 in terms of number average molecular weight, preferably 1,000 to 500,000, particularly preferably 2,000 to 200,000.

If the molecular weight is too low, the mechanical properties of the polymer are likely to be insufficient even after curing. In particular, the resulting coat is likely to be brittle and have insufficient strength. If the molecular weight is too high, the solvent solubility of the polymer is likely to be poor. In particular, the formability and leveling properties in formation of a coat are likely to be poor and the storage stability of the fluoropolymer (A) is likely to be unstable. The number average molecular weight is most preferably selected from the range of 5,000 to 100,000.

The number average molecular weight is a value determined by gel permeation chromatography (GPC) in terms of polystyrene.

The proportion of the structural unit L in the fluoropolymer (A) has only to be 0.1 mol % or more in all the structural units constituting the fluoropolymer (A). In order to provide a coat high in hardness and excellent in abrasion resistance and scratch resistance, as well as chemical resistance and solvent resistance by curing (cross-linking), the proportion thereof is 2 mol % or more, preferably 5 mol % or more, more preferably 10 mol % or more. In particular, for applications which require the formation of a cured coat excellent in heat resistance, transparency, and low water absorption, the proportion thereof is 10 mol % or more, preferably 20 mol % or more, more preferably 50 mol % or more. The upper limit thereof is less than 100 mol %.

The fluoropolymer (A) is preferably soluble in general purpose solvents. For example, it is preferably soluble in at least one of a ketone solvent, an acetate solvent, an alcohol solvent, or an aromatic solvent, or preferably soluble in a solvent mixture containing at least one general purpose solvent.

To be soluble in general purpose solvents is a particularly preferred characteristic so as to give excellent coat formability and uniformity in formation of a coat of 3 μm or lower (for example, about 0.1 μm), in the process of forming a coat, and is also advantageous in terms of productivity.

The fluoropolymer (A) may be produced by any of the following methods:

(1) a method in which a monomer having Rf is synthesized in advance, and the monomer is then polymerized to provide the fluoropolymer (A);

(2) a method in which a polymer having another functional group is synthesized at first, and the functional group of this polymer is then transformed by a polymer reaction so that the functional group Rf is introduced thereinto; and (3) a method of introducing Rf by both of the methods (1) and (2).

The fluoropolymer (A) may be produced by any of the methods disclosed in WO 02/18457 and JP 2006-027958 A, for example.

Examples of the polymerization method include radical polymerization, anionic polymerization, and cationic polymerization. For easy control of the quality, such as composition or molecular weight, and for easy industrialization, radical polymerization is particularly preferred.

The fluorine-containing ethylenic monomer to give a structural unit L is a monomer represented by the following formula:

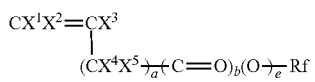

wherein $X^1$ and $X^2$ are the same as or different from each other, and each represent H or F; $X^3$ represents H, F, $CH_3$, or $CF_3$; $X^4$ and $X^5$ are the same as or different from each other, and each represent H, F, or $CF_3$; Rf is the same as mentioned above; a is an integer of 0 to 3; b and c are the same as or different from each other, and are each 0 or 1. Preferable examples for $X^1$, $X^2$, $X^3$, $X^4$, $X^5$, a, b, c, and Rf in the above monomer are the same as mentioned above.

(Fluoropolymer (B))

The fluoropolymer (B) is a fluoropolymer comprising a polymerization unit based on a fluoromonomer and a structural unit represented by the following formula (14):

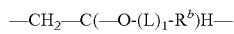

wherein $R^b$ represents an organic group having at least one carbon-carbon double bond at an end; L represents a divalent organic group; and l is 0 or 1.

The fluoromonomer is a monomer having a fluorine atom.

The fluoromonomer is preferably at least one fluoromonomer selected from the group consisting of tetrafluoroethylene (TFE), vinylidene fluoride (VdF), chlorotrifluoroethylene (CTFE), vinyl fluoride, hexafluoropropylene (HFP), hexafluoroisobutene, monomers represented by $CH_2=CZ^1(CF_2)_{n^1}Z^2$ (wherein $Z^1$ represents H, F, or Cl; $Z^2$ represents H, F, or Cl; and $n^1$ is an integer of 1 to 10), perfluoro(alkyl vinyl ethers)(PAVE) represented by $CF_2=CF-ORf^1$ (wherein $Rf^1$ represents a $C_{1-8}$ perfluoroalkyl group), and alkyl perfluorovinyl ether derivatives represented by $CF_2=CF-OCH_2-Rf^2$ (wherein $Rf^2$ represents a $C_{1-5}$ perfluoroalkyl group).

Examples of the monomers represented by $CH_2=CZ^1(CF_2)_nZ^2$ include $CH_2=CFCF_3$, $CH_2=CHCF_3$, $CH_2=CFCHF_2$, and $CH_2=CClCF_3$.

Examples of the PAVE include perfluoro(methyl vinyl ether) (PMVE), perfluoro(ethyl vinyl ether) (PEVE), perfluoro(propyl vinyl ether) (PPVE), and perfluoro(butyl vinyl ether). More preferred is PMVE, PEVE, or PPVE.

Preferable examples of the alkyl perfluorovinyl ether derivatives include those in which $Rf^2$ is a $C_{1-3}$ perfluoroalkyl group, and $CF_2=CF-OCH_2-CF_2CF_3$ is more preferred.

The fluoromonomer is more preferably at least one selected from the group consisting of TFE, CTFE, and HFP, still more preferably TFE.

The fluoropolymer (B) characteristically has a structural unit represented by the following formula (14):

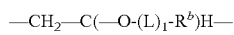

wherein $R^b$ is an organic group having at least one carbon-carbon double bond at an end; L represents a divalent organic group; and l is 0 or 1). In other words, it has a double bond as a curable moiety, and thus enables a cross-linking reaction by the reaction with a radical.

The amount of the curable moiety to be introduced may easily be controlled in production of the fluoropolymer (B).

Specific examples of $R^b$ include groups represented by the following formula (15):

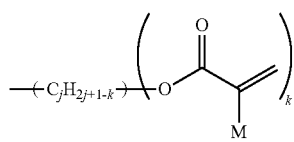

wherein M represents H, Cl, F, or $CH_3$; j is an integer of 1 to 20; k is an integer of 1 to 10; and 2j+1−k is an integer of 0 or greater.

In the formula for $R^b$, j is preferably an integer of 1 to 10, more preferably an integer of 1 to 6. Further, k is preferably an integer of 1 to 6, more preferably an integer of 1 to 3.

In order to achieve good reactivity, $R^b$ is preferably any of the groups represented by the following formulas:

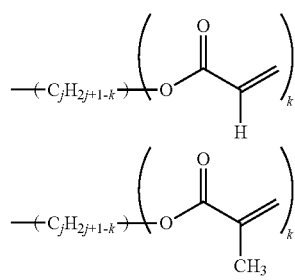

(wherein j, k, and 2j+1−k are the same as mentioned above) among the above substituents.

Specific examples of $R^b$ also include groups represented by the following formula (16):

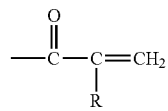

wherein R represents H, $CH_3$, F, $CF_3$, or Cl.

Groups represented by the following formulas:

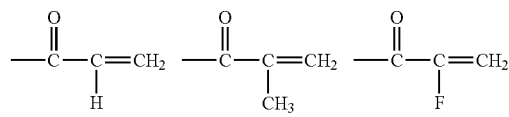

are preferred.

$R^b$ is preferably at least one substituent selected from the group consisting of the groups represented by the following formula (15):

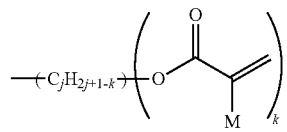

(wherein M represents H, Cl, F, or $CH_3$; j is an integer of 1 to 20; k is an integer of 1 to 10; and 2j+1−k is an integer of 0 or greater) and the groups represented by the following formula (16):

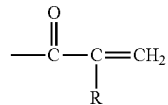

(wherein R represents H, Cl, F, CH$_3$, or CF$_3$) among the above mentioned groups.

L is preferably an organic group represented by the following formula (17):

$$-(C=O)_s-(N-H)_p-$$

wherein s is 0 or 1 and p is 0 or 1. If s and p are 1, R$^b$ is bonded to the main chain of the fluoropolymer (B) via a urethane bond. If s is 1 and p is 0, R$^b$ is bonded to the main chain of the fluoropolymer (B) via an ester bond. If s and p are 0, R$^b$ is bonded to the main chain of the fluoropolymer (B) via an ether bond.

The fluoropolymer (B) may have a structural unit of a monomer having a hydroxy group (—OH group) in addition to the above two structural units. This is preferred because the adhesiveness with a substrate is improved.

Specific examples of the structural unit of a monomer having a hydroxy group (—OH group) include hydroxy group-containing vinyl ethers such as 2-hydroxyethyl vinyl ether, 3-hydroxypropyl vinyl ether, 2-hydroxypropyl vinyl ether, 2-hydroxy-2-methylpropyl vinyl ether, 4-hydroxybutyl vinyl ether, 4-hydroxy-2-methylbutyl vinyl ether, 5-hydroxypentyl vinyl ether, and 6-hydroxyhexyl vinyl ether; and hydroxy group-containing allyl ethers such as 2-hydroxyethyl allyl ether, 4-hydroxybutyl allyl ether, and glycerol monoallyl ether. In order to achieve excellent polymerization reactivity and curability of the functional group, hydroxy group-containing vinyl ethers, especially 4-hydroxybutyl vinyl ether and 2-hydroxyethyl vinyl ether, are preferred.

The fluoropolymer (B) may comprise a polymerization unit (free from fluorine) based on a monomer copolymerizable with the fluoromonomer.

Such a copolymerizable monomer preferably comprises at least one fluorine-free ethylenic monomer selected from the group consisting of vinyl ester monomers, vinyl ether monomers, ethylene, propylene, 1-butene, 2-butene, vinyl chloride, vinylidene chloride, and unsaturated carboxylic acids.

Preferred are vinyl ester monomers, vinyl ether monomers, ethylene, and 2-butene.

Examples of the vinyl ester monomers include vinyl acetate, vinyl propionate, vinyl butyrate, vinyl isobutyrate, vinyl pivalate, vinyl caproate, vinyl versatate, vinyl laurate, vinyl stearate, vinyl cyclohexylcarboxylate, vinyl benzoate, and vinyl para-t-butylbenzoate.

Examples of the vinyl ether monomers include methyl vinyl ether, ethyl vinyl ether, butyl vinyl ether, cyclohexyl vinyl ether, and isobutyl vinyl ether.

Examples of the unsaturated carboxylic acids include acrylic acid, methacrylic acid, vinyl acetic acid, crotonic acid, cinnamic acid, 3-allyloxypropionic acid, 3-(2-allyloxyethoxycarbonyl)propionic acid, itaconic acid, itaconic acid monoesters, maleic acid, maleic acid monoesters, maleic anhydride, fumaric acid, fumaric acid monoesters, vinyl phthalate, and vinyl pyromellitate. Preferred are crotonic acid, itaconic acid, maleic acid, maleic acid monoesters, fumaric acid, fumaric acid monoesters, and 3-allyloxypropionic acid because they are less homopolymerizable and are less likely to form a homopolymer.

Examples of the fluoropolymer (B) include a copolymer of TFE, the structural unit of the formula (14), isobutylene, hydroxybutyl Vinyl ether, and other monomer(s), a copolymer of TFE, the structural unit of the formula (14), vinyl versatate, hydroxybutyl vinyl ether, and other monomer(s), and a copolymer of TFE, the structural unit of the formula (14), VdF, hydroxybutyl vinyl ether, and other monomer(s).

Preferred are a copolymer of TFE, the structural unit of the formula (14), isobutylene, hydroxybutyl vinyl ether, and other monomer(s) and a copolymer of TFE, the structural unit of the formula (14), vinyl versatate, hydroxybutyl vinyl ether, and other monomer(s), and more preferred are a copolymer of TFE, the structural unit of the formula (14), vinyl versatate, hydroxybutyl vinyl ether, and other monomer(s).

The fluoropolymer (B) is preferably a copolymer of TFE (10 to 70 mol %), the structural unit of the formula (14) (2 to 50 mol %), hydroxybutyl vinyl ether (5 to 50 mol %), and other monomer(s) (1 to 50 mol %), more preferably a copolymer of TFE (20 to 60 mol %), the structural unit of the formula (14) (5 to 30 mol %), hydroxybutyl vinyl ether (5 to 30 mol %), and other monomer(s) (1 to 50 mol %), and still more preferably a copolymer of TFE (40 to 60 mol %), the structural unit of the formula (14) (5 to 15 mol %), vinyl versatate (8 to 40 mol %), hydroxybutyl vinyl ether (5 to 15 mol %), and other monomer(s) (1 to 20 mol %).

The fluoropolymer (B) preferably has a weight average molecular weight of 1,000 to 1,000,000, more preferably 5,000 to 500,000, still more preferably 10,000 to 300,000.

The fluoropolymer (B) may suitably be produced by a method including the steps of: copolymerizing a fluoromonomer and an OH group-containing monomer to form a copolymer of a fluoromonomer and an OH group-containing monomer; and reacting the copolymer of a fluoromonomer and an OH group-containing monomer with a compound represented by the following formula (18):

$$O=C=N-R^b$$

(wherein R$^b$ is an organic group having at least one terminal double bond) to form a fluoropolymer (B). This production method may also be referred to as a first production method herein.

The compound represented by the formula (18) used in the step of producing a fluoropolymer (B) include a compound represented by the following formula (19):

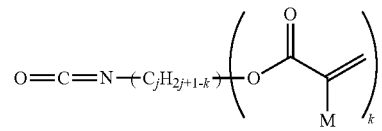

wherein M represents H, Cl, F, or CH$_3$, j is an integer of 1 to 20, k is an integer of 1 to 10, 2j+1−k is an integer of 0 or greater.

In the formula (19), j is preferably an integer of 1 to 10, more preferably an integer of 1 to 6; k is preferably an integer of 1 to 6, more preferably an integer of 1 to 3; M is preferably H or CH$_3$.

In other words, the hydroxy group in the molecule of the copolymer of a fluoromonomer and an OH group-containing monomer reacts with the isocyanate group of the compound represented by the formula (18) (addition-reacted) to form a urethane bond. In contrast, a terminal double bond in the compound represented by the formula (18) is substantially not reacted and becomes a curable moiety of the fluoropolymer (B).

The urethane bond formation easily proceeds as a result of mixing the copolymer of a fluoromonomer and an OH group-containing monomer with the compound of the formula (18) or by heating the mixture.

The heating temperature (reaction temperature) of the urethane bond formation is usually about 5° C. to 90° C., preferably about 10° C. to 90° C., more preferably about 20° C. to 80° C.

The urethane bond formation may be performed in the presence of a catalyst. The catalyst may be any conventionally known catalyst which is used for the urethane bond formation, and commercially available products are easily available.

Examples of the catalyst include organotitanium compounds such as tetraethyl titanate and tetrabutyl titanate; organotin compounds such as tin octylate, dibutyltin oxide, and dibutyltin dilaurate; and tin(II) halides such as tin(II) chloride and tin(II) bromide. Dibutyltin dilaurate is preferred.

Use of a catalyst allows the urethane bond formation to proceed in a shorter time, providing the target fluoropolymer (B).

The catalyst may be used in any appropriately adjusted amount in the urethane bond formation. For example, the amount thereof is usually about 0.00001 to 3 parts by mass, preferably about 0.0001 to 1 part by mass, for 100 parts by mass of the compound represented by the formula (18).

In the first production method, a solvent may be further used. The solvent may any solvent that does not hinder the progress of the urethane bond formation, and may be a conventionally known solvent that is usually used.

Examples of the solvent include ketone-type solvents such as methyl isobutyl ketone (MIBK) and methyl ethyl ketone (MEK); ester-type solvents such as ethyl acetate and butyl acetate; and fluorine-containing solvents such as HCFC225 (a mixture of $CF_3CF_2CHCl_2/CClF_2CF_2CHClF$). Alcohol-type solvents having an OH group are not preferred because they hinder the progress of the urethane bond formation. If the system contains water, the progress of the urethane bond formation is hindered. Thus, the solvent is more preferably dehydrated before use.

The fluoropolymer (B) may also be produced by a method comprising the step of reacting a copolymer of a fluoromonomer and an OH-containing monomer, which is a precursor thereof, with a compound represented by the following formula (20):

$$X^b—C(=O)—R^b$$

(wherein $X^b$ represents HO—, $R^{10}O$—, F—, or Cl—; $R^{10}$ represents an alkyl group or a fluoroalkyl group; $R^b$ represents an organic group having at least one terminal double bond) to form a fluoropolymer (B). Hereinafter, this production method is also referred to as a second production method.

In the formula (20), $R^{10}$ represents an alkyl group or a fluoroalkyl group. Examples of the alkyl group include $C_{1-12}$ linear, branched, or cyclic alkyl groups. Specific examples thereof include $C_{1-12}$ alkyl groups such as methyl, ethyl, n-propyl, isopropyl, n-butyl, sec-butyl, isobutyl, tert-butyl, pentyl, cyclopentyl, hexyl, cyclohexyl, octyl, and cyclodecyl. Examples of the fluoroalkyl group include $C_{1-12}$ linear, branched, or cyclic fluoroalkyl groups.

Specific examples thereof include —$CF_3$, —$CH_2CF_3$, $CH_2CF_2CF_3$, and —$CF_2CF_2CF_3$.

In the formula (20), $R^b$ is an "organic group having at least one terminal double bond" as in the case of the formula (14).

The compound represented by the formula (20) is preferably a compound represented by the formula (21):

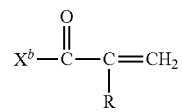

wherein R represents H, $CH_3$, F, $CF_3$, or Cl; and $X^b$ is the same as mentioned above.

More preferred are compounds represented by the following formulas:

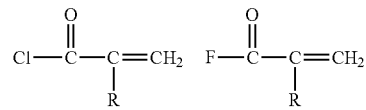

(wherein R is the same as mentioned above) which are α,β-unsaturated carboxylic halides.

Compounds represented by the following formulas:

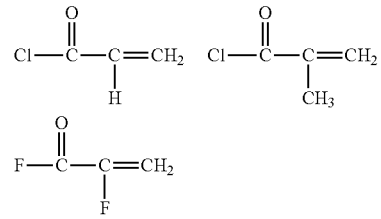

are still more preferred.

In the second production method, the hydroxy group of the copolymer of a fluoromonomer and an OH group-containing monomer and the $X^b$—C(=O)— group of the compound represented by the formula (20) are esterified to form an ester bond. In contrast, the terminal double bond in the compound represented by the formula (20) is substantially not reacted and becomes a curable moiety of the fluoropolymer (B).

The esterification easily proceeds as a result of mixing the copolymer of a fluoromonomer and an OH group-containing monomer with the compound represented by the formula (20) or heating the mixture. The reaction temperature of the esterification is usually about −20° C. to 40° C.

In the second production method, the reaction provides by-products such as HCl and HF. In order to capture these by-products, an appropriate base is preferably added. Examples of the base include pyridine, N,N-dimethylaniline, tetramethylurea, tertiary amines such as triethylamine, and magnesium metal.

An inhibitor may coexist during the reaction so as to inhibit the polymerization reaction of the compound represented by the formula (20), which is a starting material, or the carbon-carbon double bond of the fluoropolymer (B) to be produced by the reaction. Examples of the inhibitor include hydroquinone, t-butylhydroquinone, and hydroquinone monomethyl ether.

In the second production method, a solvent may be further used. If a solvent is used, the solvent may be any solvent that does not hinder the progress of the esterification, and may be a conventionally known solvent that is usually used.

Examples of the solvent include ether-type solvents such as diethyl ether and tetrahydrofuran; ketone-type solvents such as 2-hexanone, cyclohexanone, methyl amino ketone, and 2-heptanone; propylene glycol-type solvents such as propylene glycol monomethyl ether, propylene glycol monoethyl ether, propylene glycol monobutyl ether, propylene glycol monomethyl ether acetate, propylene glycol monoethyl ether acetate, propylene glycol monobutyl ether acetate, and dipropylene glycol dimethyl ether; fluorine-containing solvents such as $CH_3CCl_2F$ (HCFC-141b), a mixture of $CF_3CF_2CHCl_2/CClF_2CF_2CHClF$ (HCFC-225), perfluorohexane, perfluoro(2-butyltetrahydrofuran), methoxy-nonafluorobutane, and 1,3-bistrifluoromethylbenzene; aromatic hydrocarbons such as toluene, xylene, chlorobenzene, and chlorotoluene; and solvent mixtures of two or more of these. Alcohol-type solvents having an OH group are not preferred because they hinder the progress of the esterification. If the system contains water, the progress of the esterification is hindered. Thus, the solvent is more preferably dehydrated before use.

(Fluoropolymer (C))

The fluoropolymer (C) is a curable functional group-containing fluoropolymer (excluding the fluoropolymers (A) and (B)).

Examples of the curable functional group-containing fluoropolymer include polymers obtained by introducing a curable functional group into a fluoropolymer. The curable functional group-containing fluoropolymers include resin polymers having an obvious melting point, elastomeric polymers exhibiting rubber elasticity, and thermoplastic elastomeric polymers therebetween.

A functional group that gives curability to a fluoropolymer may appropriately be selected in accordance with the ease of producing a polymer or its curing system. Examples thereof include a hydroxy group (excluding the hydroxy group contained in a carboxyl group; the same shall apply to the following), a carboxyl group, a group represented by —COOCO—, a cyano group, an amino group, an epoxy group, and a silyl group. In order to achieve good curing reactivity, preferred is at least one group selected from the group consisting of a hydroxy group, a carboxyl group, a group represented by —COOCO—, an amino group, a cyano group, and a silyl group. More preferred is at least one group selected from the group consisting of a hydroxy group, a carboxyl group, an amino group, and a silyl group. Still more preferred is at least one group selected from the group consisting of a hydroxy group, a carboxyl group, and an amino group. Particularly preferred is at least one group selected from the group consisting of a hydroxy group and a carboxyl group. Any of these curable functional groups are usually introduced into a fluoropolymer by copolymerization with a monomer having such a curable functional group.

Examples of the curable functional group-containing monomer include hydroxy group-containing monomers, carboxyl group-containing monomers, amino group-containing monomers, and silicone-type vinyl monomers. One or two or more of these may be used.

The curable functional group-containing fluoropolymer preferably has a polymerization unit based on a fluoromonomer and a polymerization unit based on at least one curable functional group-containing monomer selected from the group consisting of hydroxy group-containing monomers, carboxyl group-containing monomers, amino group-containing monomers, and silicone-type vinyl monomers. The curable functional group-containing fluoropolymer more preferably has a polymerization unit based on a fluoromonomer and a polymerization unit based on at least one curable functional group-containing monomer selected from the group consisting of hydroxy group-containing monomers and carboxyl group-containing monomers.

The proportion of the polymerization unit based on the curable functional group-containing monomer is preferably 8 to 30 mol % of all the polymerization units constituting the curable functional group-containing fluoropolymer. The lower limit thereof is more preferably mol %, whereas the upper limit thereof is more preferably mol %.

Nonlimiting examples of the curable functional group-containing monomer include the following. One or two or more of these may be used.

(1-1) Hydroxy Group-Containing Monomers

Examples of the hydroxy group-containing monomers include hydroxy group-containing vinyl ethers such as 2-hydroxyethyl vinyl ether, 3-hydroxypropyl vinyl ether, 2-hydroxypropyl vinyl ether, 2-hydroxy-2-methylpropyl vinyl ether, 4-hydroxybutyl vinyl ether, 4-hydroxy-2-methylbutyl vinyl ether, 5-hydroxypentyl vinyl ether, and 6-hydroxyhexyl vinyl ether; and hydroxy group-containing allyl ethers such as 2-hydroxyethyl allyl ether, 4-hydroxybutyl allyl ether, and glycerol monoallyl ether. In order to achieve excellent polymerization reactivity and excellent curability of the functional group, hydroxy group-containing vinyl ethers are preferred, and at least one monomer selected from the group consisting of 4-hydroxybutyl vinyl ether and 2-hydroxyethyl vinyl ether is particularly preferred.

Examples of other hydroxy group-containing monomers include hydroxyalkyl (meth)acrylates such as 2-hydroxyethyl acrylate and 2-hydroxyethyl methacrylate.

(1-2) Carboxyl Group-Containing Monomers

A preferred example of the carboxyl group-containing monomers is at least one monomer selected from the group consisting of: unsaturated carboxylic acids (e.g., unsaturated monocarboxylic acids and unsaturated dicarboxylic acids) represented by the following formula (II):

(wherein $R^3$, $R^4$, and $R^5$ are the same as or different from each other, and each represent a hydrogen atom, an alkyl group, a carboxyl group, or an ester group; and n is 0 or 1); esters and acid anhydrides thereof; and carboxyl group-containing vinyl ether monomers represented by the following formula (III):

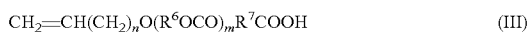

(wherein $R^6$ and $R^7$ are the same as or different from each other, and each represent a saturated or unsaturated linear, branched, or cycloalkylene group; n is 0 or 1; and m is 0 or 1).

Specific examples of the carboxyl group-containing monomers include acrylic acid, methacrylic acid, vinyl acetate, crotonic acid, cinnamic acid, 3-allyloxypropionic acid, 3-(2-allyloxyethoxycarbonyl)propionic acid, itaconic acid, itaconic acid monoesters, maleic acid, maleic acid monoesters, maleic anhydride, fumaric acid, fumaric acid monoesters, vinyl phthalate, and vinyl pyromellitate. Preferred is at least one acid selected from the group consisting of crotonic acid, itaconic acid, maleic acid, maleic acid monoesters, fumaric acid, fumaric acid monoesters, and 3-allyloxypropionic acid because they are less homopolymerizable and are less likely to form a homopolymer.

Specific examples of the carboxyl group-containing vinyl ether monomers represented by the formula (III) include 3-(2-allyloxyethoxycarbonyl)propionic acid, 3-(2-allyloxybutoxycarbonyl)propionic acid, 3-(2-vinyloxyethoxycarbonyl)propionic acid, and 3-(2-vinyloxybutoxbutoxycarbonyl) propionic acid. Preferred is 3-(2-allyloxyethoxycarbonyl) propionic acid because it advantageously has good stability and polymerization reactivity.

(1-3) Amino Group-Containing Monomers

Examples of the amino group-containing monomers include amino vinyl ethers represented by $CH_2=CH-O-(CH_2)_x-NH_2$ (wherein x=0 to 10); allyl amines represented by $CH_2=CH-O-CO(CH_2)_x-NH_2$ (wherein x=1 to 10); and others such as aminomethylstyrene, vinylamine, acrylamide, vinylacetamide, and vinylformamide.

(1-4) Silyl Group-Containing Monomers

Examples of the silyl group-containing monomers include silicone-type vinyl monomers. Examples of the silicone-type vinyl monomers include (meth)acrylic acid esters such as $CH_2=CHCO_2(CH_2)_3Si(OCH_3)_3$, $CH_2=CHCO_2(CH_2)_3Si(OC_2H_5)_3$, $CH_2=C(CH_3)CO_2(CH_2)_3Si(OCl_3)_3$, $CH_2=C(CH_3)CO_2(CH_2)_3Si(OC_2H_5)_3$, $CH_2=CHCO_2(CH_2)_3SiCH_3(OC_2H_5)_2$, $CH_2=C(CH_3)CO_2(CH_2)_3SiC_2H_5(OCH_3)_2$, $CH_2=C(CH_3)CO_2(CH_2)_3Si(CH_3)_2(OC_2H_5)$, $CH_2=C(CH_3)CO_2(CH_2)_3Si(CH_3)_2OH$, $CH_2=CH(CH_2)_3Si(OCOCH_3)_3$, $CH_2=C(CH_3)CO_2(CH_2)_3SiC_2H_5(OCOCH_3)_2$, $CH_2=C(CH_3)CO_2(CH_2)_3SiCH_3(N(CH_3)COCH_3)_2$, $CH_2=CHCO_2(CH_2)_3SiCH_3[ON(CH_3)C_2H_5]_2$, and $CH_2=C(CH_3)CO_2(CH_2)_3SiC_6H_5[ON(CH_3)C_2H_5]_2$; vinylsilanes such as $CH_2=CHSi[ON=C(CH_3)(C_2H_5)]_3$, $C_2=CHSi(OCH_3)_3$, $CH_2=CHSi(OC_2H_5)_3$, $CH_2=CHSiCH_3(OCH_3)_2$, $CH_2=CHSi(OCOCH_3)_3$, $CH_2=CHSi(CH_3)_2(OC_2H_5)$, $CH_2=CHSi(CH_3)_2SiCH_3(OCH_3)_2$, $CH_2=CHSiC_2H_5(OCOCH_3)_2$, $CH_2=CHSiCH_3[ON(CH_3)C_2H_5]_2$, vinyl trichlorosilane, and partial hydrolysates thereof; and vinyl ethers such as trimethoxysilyl ethyl vinyl ether, triethoxysilyl ethyl vinyl ether, trimethoxysilyl butyl vinyl ether, methyldimethoxysilyl ethyl vinyl ether, trimethoxysilyl propyl vinyl ether, and triethoxysilyl propyl vinyl ether.

The curable functional group-containing fluoropolymer preferably has a polymerization unit based on a fluorovinyl monomer.

The proportion of the polymerization unit based on a fluorovinyl monomer is preferably 20 to 49 mol % in all the polymerization units of the curable functional group-containing fluoropolymer. The lower limit thereof is more preferably 30 mol %, still more preferably 40 mol %. The upper limit thereof is more preferably 47 mol %.

The fluorovinyl monomer is preferably at least one selected from the group consisting of tetrafluoroethylene (TFE), vinylidene fluoride (VdF), chlorotrifluoroethylene (CTFE), vinyl fluoride, hexafluoropropylene, and perfluoro (alkyl vinyl ethers). For excellent characteristics such as dispersibility, moisture resistance, heat resistance, incombustibility, adhesiveness, copolymerizability, and chemical resistance, at least one selected from the group consisting of TFE, CTFE, and VdF is more preferred. For excellent weather resistance and much excellent moisture resistance, at least one selected from the group consisting of TFE and CTFE is particularly preferred, and TFE is most preferred.

The curable functional group-containing fluoropolymer preferably has a polymerization unit based on at least one fluorine-free vinyl monomer selected from the group consisting of vinyl carboxylates, alkyl vinyl ethers, and non-fluorinated olefins.

The vinyl carboxylates have an effect of improving the compatibility. Examples of the vinyl carboxylates include vinyl acetate, vinyl propionate, vinyl butyrate, vinyl isobutyrate, vinyl pivalate, vinyl caproate, vinyl versatate, vinyl laurate, vinyl stearate, vinyl cyclohexylcarboxylate, vinyl benzoate, and vinyl para-t-butylbenzoate.

Examples of the alkyl vinyl ethers include methyl vinyl ether, ethyl vinyl ether, butyl vinyl ether, and cyclohexyl vinyl ether.

Examples of the non-fluorinated olefins include ethylene, propylene, n-butene, and isobutene.

The polymerization unit based on a fluorine-free vinyl monomer preferably constitutes all the polymerization units other than the polymerization unit based on a curable functional group-containing vinyl monomer and the polymerization unit based on a fluorovinyl monomer.

Examples of the fluoropolymer into which a curable functional group is to be introduced include the following, in accordance with the polymerization units constituting the target polymer.

Examples of the fluoropolymer into which a curable functional group is to be introduced include (1) perfluoroolefinic polymers mainly comprising a perfluoroolefin unit, (2) CTFE-based polymers mainly comprising a chlorotrifluoroethylene (CTFE) unit, (3) VdF polymers mainly comprising a vinylidene fluoride (VdF) unit, and (4) fluoroalkyl group-containing polymers mainly comprising a fluoroalkyl unit.

(1) Perfluoroolefinic Polymers Mainly Comprising a Perfluoroolefin Unit

In a perfluoroolefinic polymer mainly comprising a perfluoroolefin unit, the proportion of the perfluoroolefin unit is preferably 20 to 49 mol % in all the polymerization units constituting the perfluoroolefinic polymer. The lower limit thereof is more preferably 30 mol %, still more preferably 40 mol %. The upper limit thereof is more preferably 47 mol %. Specific examples thereof include a tetrafluoroethylene (TFE) homopolymer, copolymers of TFE with a monomer such as hexafluoropropylene (HFP) or a perfluoro(alkyl vinyl ether) (PAVE), and copolymers with any other monomer copolymerizable with such monomers.

Examples of the copolymerizable monomers include vinyl carboxylates such as vinyl acetate, vinyl propionate, vinyl butyrate, vinyl isobutyrate, vinyl pivalate, vinyl caproate, vinyl versatate, vinyl laurate, vinyl stearate, vinyl cyclohexylcarboxylate, vinyl benzoate, and vinyl para-t-butylbenzoate; alkyl vinyl ethers such as methyl vinyl ether, ethyl vinyl ether, butyl vinyl ether, and cyclohexyl vinyl ether; non-fluorinated olefins such as ethylene, propylene, n-butene, and isobutene; and fluorine-containing monomers such as vinylidene fluoride (VdF), chlorotrifluoroethylene (CTFE), vinyl fluoride (VF), and fluorovinyl ethers.

In order to achieve excellent pigment dispersibility, weather resistance, copolymerizability, and chemical resistance, TFE-based polymers mainly comprising a TFE unit is preferred among the perfluoroolefinic polymers mainly comprising a perfluoroolefin unit. In a TFE-based polymer, the proportion of the TFE unit is preferably 20 to 49 mol % in all the polymerization units constituting the TFE-based polymer. The lower limit thereof is more preferably 30 mol %, still more preferably 40 mol %. The upper limit thereof is more preferably 47 mol %.

Examples of the curable functional group-containing fluoropolymers obtained by introducing a curable functional group to a perfluoroolefinic polymer mainly comprising a perfluoroolefin unit include a copolymer of TFE, isobutylene, hydroxybutyl vinyl ether, and other monomer(s), a copolymer of TFE, vinyl versatate, hydroxybutyl vinyl ether, and other monomer(s), and a copolymer of TFE, VdF, hydroxybutyl vinyl ether, and other monomer(s). Particularly preferred is at least one copolymer selected from the group consisting of a copolymer of TFE, isobutylene, hydroxybutyl vinyl ether, and other monomer(s) and a copolymer of TFE, vinyl versatate, hydroxybutyl vinyl ether, and other monomer(s). Examples of coating materials comprising such a curable polymer include ZEFFLE® GK series (Daikin Industries, Ltd.).

(2) Chlorotrifluoroethylene (CTFE)-Based Polymers Mainly Comprising a CTFE Unit

Examples of the curable functional group-containing fluoropolymers obtained by introducing a curable functional group into a CTFE-based polymer mainly comprising a CTFE unit include a copolymer of CTFE, hydroxybutyl vinyl ether, and other monomer(s). Examples of coating materials comprising a CTFE-based curable polymer include LUMIFLON® (Asahi Glass Co., Ltd.), FLU-ONATE® (Dainippon Printing Ink Manufacturing Co., Ltd.), CEFRAL COAT® (Central Glass Co., Ltd.), and ZAFLON® (Toagosei Co., Ltd.).

(3) Vinylidene Fluoride (VdF)-Based Polymers Mainly Comprising a VdF Unit

Examples of the curable functional group-containing fluoropolymers obtained by introducing a curable functional group into a VdF-based polymer mainly comprising a VdF unit include a copolymer of VdF, TFE, hydroxybutyl vinyl ether, and other monomer(s).

(4) Fluoroalkyl Group-Containing Polymers Mainly Comprising a Fluoroalkyl Unit

Examples of the curable functional group-containing fluoropolymers obtained by introducing a curable functional group into a fluoroalkyl group-containing polymer mainly comprising a fluoroalkyl unit include a copolymer of $CF_3CF_2(CF_2CF_2)_nCH_2CH_2OCOCH=CH_2$ (mixture of a monomer satisfying n=3 and a monomer satisfying n=4), 2-hydroxyethyl methacrylate, and stearyl acrylate. Examples of the fluoroalkyl group-containing polymers include UNIDYNE® and FTONE® (Daikin Industries, Ltd.), and Zonyl® (DuPont).

For good weather resistance and moisture-proof properties, preferred among the polymers (1) to (4) as the fluoropolymer into which a curable functional group is introduced are perfluoroolefinic polymers, more preferably TFE-based polymers mainly comprising a TFE unit.

The curable functional group-containing fluoropolymer may be produced by the method disclosed in JP 2004-204205 A, for example.

The composition of the present invention preferably contains 99.9 to 5% by mass, more preferably 99.0 to 20% by mass, still more preferably 97.0 to 50% by mass, of the fluoropolymer having at least one group selected from the group consisting of polymerizable functional groups and cross-linkable functional groups.

The composition of the present invention may contain an acrylic component.

The acrylic component is preferably at least one selected from the group consisting of acrylic monomers and acrylic polymers.

A preferred example of the acrylic monomers is at least one selected from the group consisting of (meth)acrylic acid esters, (meth)acrylic acid, hydroxy group-containing (meth)acrylic acid esters, amino group-containing (meth)acrylic acid esters, and polyfunctional acrylic monomers.

The term "(meth)acrylic acid ester(s)" simply referred herein excludes hydroxy group-containing (meth)acrylic acid esters, amino group-containing (meth)acrylic acid esters, and polyfunctional acrylic monomers.

A more preferred example of the acrylic monomers is at least one selected from the group consisting of (meth)acrylic acid esters, (meth)acrylic acid, and polyfunctional acrylic monomers, and a still more preferred example of the acrylic monomers is at least one selected from the group consisting of (meth)acrylic acid esters and polyfunctional acrylic monomers. Particularly preferably, any (meth)acrylic acid ester is used alone or a (meth)acrylic acid ester and a polyfunctional acrylic monomer are used together.

A preferred example of the (meth)acrylic acid esters is at least one selected from the group consisting of methyl (meth)acrylate, ethyl (meth)acrylate, propyl (meth)acrylate, isopropyl (meth)acrylate, n-butyl (meth)acrylate, i-butyl (meth)acrylate, t-butyl (meth)acrylate, 2-ethylhexyl (meth) acrylate, octyl (meth)acrylate, lauryl (meth)acrylate, cyclohexyl (meth)acrylate, and benzyl (meth)acrylate. A more preferred example thereof is methyl (meth)acrylate.

Commonly known polyfunctional acrylic monomers are compounds obtained by replacing a hydroxy group in any polyhydric alcohol (e.g., diol, triol, or tetraol) by an acrylate group, a methacrylate group, or an α-fluoroacrylate group. Specific examples thereof include compounds obtained by replacing two or more hydroxy groups in any polyhydric alcohol (e.g., 1,3-butanediol, 1,4-butanediol, 1,6-hexanediol, diethylene glycol, tripropylene glycol, neopentyl glycol, trimethylol propane, pentaerythritol, or dipentaerythritol) by any of an acrylate group, a methacrylate group, and an α-fluoroacrylate group. Further, polyfunctional acrylic monomers may be utilized which are obtained by replacing two or more hydroxy groups in any polyhydric alcohol having a fluoroalkyl group, a fluoroalkyl group having an ether bond, a fluoroalkylene group, or a fluoroalkylene group having an ether bond, by an acrylate group, a methacrylate group, or an α-fluoroacrylate group. These monomers are preferred especially because they are capable of keeping the refractive index of their cured products low.

The polyfunctional acrylic monomer is preferably a polyfunctional (meth)acrylic acid ester, and more preferably at least one selected from the group consisting of ethylene glycol di(meth)acrylate, diethylene glycol di(meth)acrylate, triethylene glycol di(meth)acrylate, 1,2-propylene glycol di(meth)acrylate, 1,3-propylene glycol di(meth)acrylate, 1,3-butylene glycol di(meth)acrylate, 1,4-butylene glycol di(meth)acrylate, 1,6-hexanediol di(meth)acrylate, neopentyl glycol di(meth)acrylate, 1,9-nonanediol di(meth)acrylate, 1,10-decanediol di(meth)acrylate, polyethylene glycol di(meth)acrylate, trimethylol propane tri(meth)acrylate, pentaerythritol tri(meth)acrylate, pentaerythritol tetra(meth)acrylate, dipentaerythritol hexa(meth)acrylate, and allyl (meth)acrylate, still more preferably trimethylol propane tri(meth)acrylate and dipentaerythritol hexa(meth)acrylate.

The acrylic component may be an acrylic polymer. The acrylic polymer is preferably a (meth)acrylic acid ester homopolymer or a (meth)acrylic acid ester copolymer.

The (meth)acrylic acid ester copolymer is preferably a copolymer of a (meth)acrylic acid ester with at least one monomer selected from the group consisting of (meth)acrylic acid, hydroxy group-containing (meth)acrylic acid esters, amino group-containing (meth)acrylic acid esters, polyfunctional acrylic monomers, alkyl vinyl ethers, alkyl vinyl esters, crotonic acid, maleic acid, fumaric acid, itaconic acid, (meth)acrylonitrile, vinyl chloride, vinylidene chloride, and (meth)acrylamide.

Examples of the alkyl vinyl ethers include methyl vinyl ether, ethyl vinyl ether, and butyl vinyl ether.

Examples of the alkyl vinyl esters include vinyl formate, vinyl acetate, vinyl propionate, vinyl butyrate, vinyl caproate, and vinyl stearate.

In the (meth)acrylic acid ester homopolymer and the (meth)acrylic acid ester copolymer, the proportion of the polymerization unit based on a (meth)acrylic acid ester is preferably 1 to 100 mol % in all of the polymerization units, and the proportion of the polymerization unit based on a (meth)acrylic acid ester is more preferably 50 to 100 mol %.

The acrylic polymer has a weight average molecular weight within a range of 5000 to 2000000, preferably within a range of 10000 to 1700000. If the weight average molecular weight is too low, the gas barrier properties and vapor barrier properties may be degraded. If the weight average molecular weight is too high, the compatibility with a fluoropolymer and the easiness of applying the coating material may be degraded.

The weight average molecular weight of the acrylic polymer may be calculated by gel permeation chromatography (GPC), for example.

The acrylic component (A) is preferably at least one selected from the group consisting of (meth)acrylic acid ester monomers, polyfunctional acrylic monomers, unsaturated carboxylic acid monomers, (meth)acrylic acid ester homopolymers, and (meth)acrylic acid ester copolymers, more preferably at least one selected from the group consisting of copolymers of any (meth)acrylic acid ester monomer and any polyfunctional (meth)acrylic acid ester monomer, homopolymers of any (meth)acrylic acid ester, and copolymers of any (meth)acrylic acid ester and (meth) acrylic acid.

The acrylic component (A) is also preferably at least one selected from the group consisting of copolymers of any (meth)acrylic acid ester monomer and any polyfunctional (meth)acrylic acid ester monomer, homopolymers of any (meth)acrylic acid ester, and copolymers of any (meth) acrylic acid ester and any unsaturated carboxylic acid.

The composition of the present invention preferably satisfies a mass ratio between the acrylic component (A) and the fluoropolymer having at least one group selected from the group consisting of polymerizable functional groups and cross-linkable functional groups of 1/99 to 99/1 (acrylic component (A)/fluoropolymer). Use of the acrylic component (A) within the above specific range makes it possible to form a coat excellent in an effect of preventing corrosion and adhesiveness. The mass ratio (acrylic component (A)/fluoropolymer) is preferably 1/99 to 70/30, more preferably 1/99 to 50/50, particularly preferably 5/95 to 30/70.

In the composition of the present invention, the sum of the masses of the acrylic component and the fluoropolymer having at least one group selected from the group consisting of polymerizable functional groups and cross-linkable functional groups is preferably 90% by mass or more, more preferably 95% by mass or more, of the whole amount of the polymer components (if the acrylic component is a monomer, the amount of the acrylic component is included).

The composition of the present invention may be suitably used as a coating material. Examples of the coating material include solvent-based coating materials, water-based coating materials, and powder coating materials. Coatings in such forms may be prepared by any usual method.

The composition of the present invention is preferably a solvent-based coating material in order to achieve easy formation of a coat, good curability, and good drying properties.

In the case of a solvent-based coating material, the composition of the present invention further comprises a solvent. A solvent-based coating material may be produced by dissolving or dispersing in a solvent the fluoropolymer having at least one group selected from the group consisting of polymerizable functional groups and cross-linkable functional groups and the nitrogen-containing aromatic heterocyclic compound having a polymerizable functional group.

The solvent is preferably a polar organic solvent, more preferably a ketone-type solvent, an ester-type solvent, a carbonate-type solvent, a cyclic-ether-type solvent, or an amide-type solvent. Specific examples thereof include methyl ethyl ketone, methyl isobutyl ketone (MIBK), acetone, diethyl ketone, dipropyl ketone, ethyl acetate, methyl acetate, propyl acetate, butyl acetate, ethyl lactate, dimethyl carbonate, diethyl carbonate, dipropyl carbonate, methylethyl carbonate, tetrahydrofuran, methyl tetrahydrofuran, dioxane, dimethyl formamide, and dimethyl acetamide.

In the composition of the present invention which is a solvent-based coating material, the sum of the amounts of the acrylic polymer and the fluoropolymer (B) is preferably 1 to 95% by mass, more preferably 5 to 70% by mass, in 100% by mass of the whole coating material.

When the composition of the present invention is applied as a coating material, the coating may be performed under usual temperature conditions in accordance with the manner of coating.

Examples of the coating method include knife coating, roll coating, gravure coating, blade coating, reverse coating, rod coating, air doctor coating, curtain coating, Faknelane coating, kiss coating, screen coating, spin coating, spray coating, extrusion coating, micro-gravure coating, flow coating, bar coating, die coating, and dip coating. The method may be chosen in accordance with the type and shape of a substrate, the productivity, and the controllability of the coat thickness, for example.

For solvent-based coating materials, curing and drying are performed at 10° C. to 300° C., usually 10° C. to 200° C., for 30 seconds to 3 days. After the curing and drying, the coating may be post-cured. The post-curing is usually completed at 10° C. to 200° C. in 1 minute to 3 days.

The curing may be achieved not only by heat but also by photo-irradiation, for example, by applying active energy rays such as ultraviolet rays, electron beams, or radiation.

The composition of the present invention may contain any of curing agents, curing accelerators, curing retarders, pigments, pigment dispersants, antifoams, leveling agents, ultraviolet absorbers, photostabilizers, thickening agents, adhesiveness improvers, flatting agents, and active-energy-curing initiators.

The composition of the present invention may further comprise an active-energy-curing initiator, if necessary. If the fluoropolymer having at least one group selected from the group consisting of polymerizable functional groups and cross-linkable functional groups is a fluoropolymer (A) or (B), the composition particularly preferably comprises an active-energy-curing initiator.

The active-energy-curing initiator does not generate radicals or cations until it is irradiated with electromagnetic waves within a wavelength range of, for example, 350 nm or shorter (i.e., ultraviolet rays, electron beams, X-rays, γ-rays, or the like), and then it serves as a catalyst for initiating the curing (cross-linking reaction) of the carbon-carbon double bond in the fluoropolymer. Those generating radicals or cations, especially radicals, by ultraviolet rays are usually used. Examples thereof include the following.

Acetophenone-type initiators: acetophenone, chloroacetophenone, diethoxyacetophenone, hydroxyacetophenone, α-aminoacetophenone, hydroxypropiophenone, 2-methyl-1-[4-(methylthio) phenyl]-2-morpholinepropan-1-on, and the like.

Benzoin-type initiators: benzoin, benzoin methyl ether, benzoin ethyl ether, benzoin isopropyl ether, benzoin isobutyl ether, benzyl dimethyl ketal, and the like.

Benzophenone-type initiators: benzophenone, benzoylbenzoic acid, methyl benzoylbenzoate, 4-phenyl benzophenone, hydroxy benzophenone, hydroxy-propyl benzophenone, acrylated benzophenone, Michler's ketone, and the like.

Thioxanthones: thioxanthone, chlorothioxanthone, methylxanthone, diethylthioxanthone, dimethylthioxanthone, and the like.

Others: benzyl, α-acyloxime ester, acylphosphine oxide, glyoxylate esters, 3-ketocoumarin, 2-ethylanthraquinone, camphorquinone, anthraquinone, and the like.

The composition of the present invention may further comprise a curing agent, if necessary. In the case of a fluoropolymer (C), the fluoropolymer having at least one group selected from the group consisting of polymerizable functional groups and cross-linkable functional groups particularly preferably comprises a curing agent. The curing agent is chosen in accordance with the functional group of a curable polymer. In the case of hydroxy group-containing fluoropolymers, isocyanate-type curing agents, melamine resin, silicate compounds, and isocyanate group-containing silane compounds are preferred, for example. In the case of carboxyl group-containing fluoropolymers, amino-type curing agents and epoxy-type curing agents are usually used, and in the case of amino group-containing fluoropolymers, carbonyl group-containing curing agents, epoxy-type curing agents, and acid-anhydride-type curing agents are usually used.

The curing agent is preferably added such that the amount thereof is 0.1 to 5 mol equivalents, more preferably 0.5 to 1.5 mol equivalents, to 1 equivalent of the curable functional group in the curable functional group-containing fluoropolymer.

The amount of the curable functional group in the curable functional group-containing fluoropolymer may be calculated by any appropriate combination of NMR, FT-IR, elemental analysis, X-ray fluorescence analysis, and neutralization titration in accordance with the types of the monomers.

Examples of the curing accelerators include organotin compounds, acidic phosphoric acid esters, reaction products of any acidic phosphoric acid ester and any amine, saturated or unsaturated polycarboxylic acids or anhydrides thereof, organotitanate compounds, amine compounds, and lead octylate.

One curing accelerator may be used alone, or two or more thereof may be used in combination. The proportion of the curing accelerator for 100 parts by weight of the curable functional group-containing fluoropolymer is preferably about $1.0 \times 10^{-6}$ to $1.0 \times 10^{-2}$ parts by weight, more preferably about $5.0 \times 10^{-5}$ to $1.0 \times 10^{-3}$ parts by weight.

The coating may be performed under usual temperature conditions in accordance with the manner of coating.

For solvent-based coating materials, curing and drying are performed at 10° C. to 300° C., usually 100° C. to 200° C., for 30 seconds to 3 days. After the curing and drying, the coating may be post-cured. The post-curing is usually completed at 20° C. to 300° C. in 1 minute to 3 days.

Since the composition of the present invention is capable of forming a coat excellent in an effect of preventing corrosion, transparency, and adhesiveness with metal, it is particularly suitable as an anti-corrosive coating material for protecting metal surfaces. Since the composition of the present invention is capable of forming a coat excellent in an effect of preventing corrosion, transparency, and adhesiveness with metal, it is suitable as an adhesive for bonding of optical members. The composition of the present invention is also suitable as adhesive for applications other than bonding of optical members.

Examples of the metal include copper, silver, aluminum, iron, SUS, nickel, molybdenum, chromium, zinc, and other steel sheets. In order to achieve particularly excellent adhesiveness with metal and anti-corrosive properties, copper or silver is preferred. Copper is particularly preferred. Thus, the composition of the present invention is more suitable as a coating composition for preventing corrosion of copper or silver. Copper may be not only copper sheets but also those prepared by vapor-depositing copper on a substrate or those prepared by stacking copper foil on a substrate. Silver may be not only silver sheets but also those prepared by vapor-depositing silver on a substrate or those prepared by stacking silver foil on a substrate.

Since the composition of the present invention is capable of suppressing occurrence of migration to various conductive parts such as printed circuit boards, conductive parts of multilayer substrates, electrodes of connectors, silver or copper patterns, conductive films of silver or copper mesh, metal particles of silver or copper, and conductive films of metal nanowires, it is also suitable as a coating composition for suppressing occurrence of migration.

Examples of the applications of the composition of the present invention include protection of conductive lines, electric wires, electric contacts, electronic devices, antennas, and metal portions of elements of touchscreens, LEDs, solar cells, organic EL devices, outdoor electronic devices, and other electronic equipment. Specific examples thereof include protection of copper or silver components such as lead-out lines of touchscreens, transparent electrodes of touchscreens, LED lead frames, and lead-out lines of solar cells.

The present invention also relates to a coated article comprising a substrate and a coat formed from the aforementioned composition on the substrate. The substrate is preferably a resin containing metal dispersed or partially dispersed therein or a laminate of metal/resin in which the whole or a part of the surface of a resin is covered with a metal. Examples of the metal include copper, silver, aluminum, iron, SUS, nickel, molybdenum, chromium, and zinc. In order to achieve a particularly excellent effect of preventing corrosion and adhesiveness, copper or silver is preferred. Further, copper is particularly preferred.

Examples of the coated article of the present invention include metal conductive lines, electronic devices, antennas, and elements of touchscreens, LEDs, solar cells, organic EL devices, outdoor electronic devices, and other electronic equipment. Specific examples thereof include copper or silver articles such as lead-out lines of touchscreens, transparent electrodes of touchscreens, LED lead frames, and lead-out lines of solar cells.

The present invention also relates to a sheet formed from the aforementioned composition. The sheet of the present invention is suitably used as a pressure-sensitive sheet or an adhesive sheet for bonding of optical members. The sheet of the present invention is also suitably used as a pressure-sensitive sheet or an adhesive sheet for applications other than bonding of optical members.

The sheet of the present invention may be produced by applying the composition on a substrate, drying the resulting coat, and curing the coat if necessary. The dried and cured sheet may be peeled off from the substrate so that a monolayer sheet may be produced.

If the composition is a solvent-based coating material, curing and drying are performed at 10° C. to 300° C., usually 10° C. to 200° C., for 30 seconds to 3 days. After the curing and drying, the coating may be post-cured. The post-curing is usually completed at 10° C. to 200° C. in 1 minute to 3 days.

The curing may be achieved not only by heat but also by photo-irradiation, for example, by applying active energy rays such as ultraviolet rays, electron beams, or radiation.

The sheet of the present invention may be bonded to any other layer by placing the sheet on another layer or inserting the sheet between two other layers, and then compressing the laminate.

The present invention also relates to a laminated sheet comprising a release sheet and a sheet formed from the aforementioned composition on the release sheet. The release sheet may be disposed on one side of the coat or both sides of the coat.

The laminated sheet of the present invention may be produced by applying the composition on a release sheet, drying the resulting coat, and curing the coat if necessary. The drying and curing conditions are as mentioned above.

The release sheet may be a sheet prepared by applying a release agent to a substrate, or a fluororesin sheet, for example. Examples of the substrate include polyester resin such as polyethylene terephthalate. Examples of the release agent include silicone-type agents, fluorine-type agents, fluorosilicone-type agents, and silicone-free olefin-, alkyd-, alkyl-, or long chain alkyl-type agents.

In the use of the laminated sheet of the present invention, the release sheet is peeled off and the sheet formed from the composition is attached to another layer. The sheet formed from the composition may be bonded to any other layer by placing the sheet on another layer or inserting the sheet between other two layers, and then compressing the laminate.

The sheet formed from the composition is high in an effect of preventing corrosion of metal and excellent in adhesiveness with metal, as well as transparency.

The sheet is also capable of suppressing occurrence of migration to various conductive parts such as printed circuit boards, conductive parts of multilayer substrates, electrodes of connectors, silver or copper patterns, and conductive films of silver or copper mesh.

Using the aforementioned composition and the aforementioned sheet and laminated sheet, laminates having any of the laminated structures shown in FIGS. 1 to 4 may be produced.

In an embodiment shown in FIG. 1, an insulation layer 21, a sheet 22 formed from the composition, a metal layer 23, and an insulation layer 24 are disposed in this order. The sheet 22 formed from the composition protects the metal layer 23 from corrosion and strongly bonds the insulation layer 21 and the metal layer 23. The insulation layers 21 and 24 are preferably transparent substrates, and may be formed from glass, polyethylene terephthalate, a cycloolefin polymer, a polyimide polymer, a urethane polymer, an acrylic polymer, or a polymer mixture of a urethane polymer and an acrylic polymer. The metal layer 23 may be formed from copper, silver, aluminum, iron, SUS, nickel, molybdenum, chromium, or zinc, and preferably formed from copper or silver. The insulation layers 21 and 24 each may have a primer layer on one or both of the surfaces thereof so as to improve the adhesiveness. The primer layer may be a sheet formed from the composition of the present invention.

Figure 2:
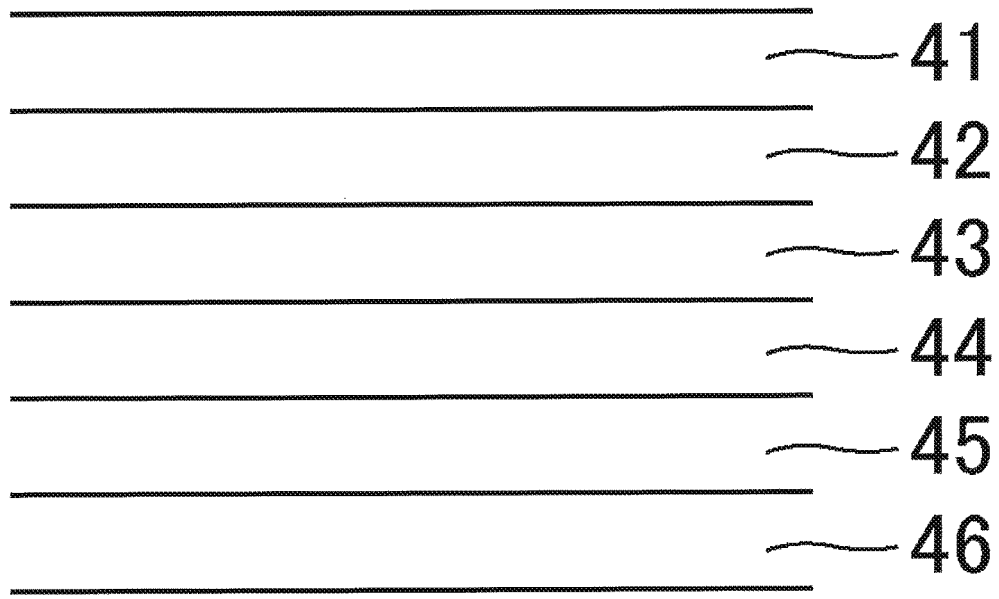
FIG. 2 shows another example of the lamination structure including a coat formed from the composition of the present invention, and the sheet and the laminated sheet of the present invention.

In an embodiment shown in FIG. 2, an insulation layer 41, a sheet 42 formed from the composition, a metal layer 43, an insulation layer 44, a metal layer 45, and a sheet 46 formed from the composition are disposed in this order. As shown here, two metal layers may be disposed with an insulation layer in between.

The sheets 42 and 46 formed from the composition protect the metal layers 43 and 45 from corrosion and strongly bond the insulation layer 41 and the metal layer 43. Further, the laminate of the present embodiment may be bonded to another optical member with the sheet 46 in between. The insulation layers 41 and 44 are preferably transparent substrates, and may be formed from glass, polyethylene terephthalate, a cycloolefin polymer, a polyimide polymer, a urethane polymer, an acrylic polymer, or a polymer mixture of a urethane polymer and an acrylic polymer. The metal layers 43 and 45 may be formed from copper, silver, aluminum, iron, SUS, nickel, molybdenum, chromium, or zinc, and preferably formed from copper or silver. The insulation layers 41 and 44 each may have a primer layer on one or both of the surfaces thereof so as to improve the adhesiveness. The primer layer may be a sheet formed from the composition of the present invention.

Figure 3:
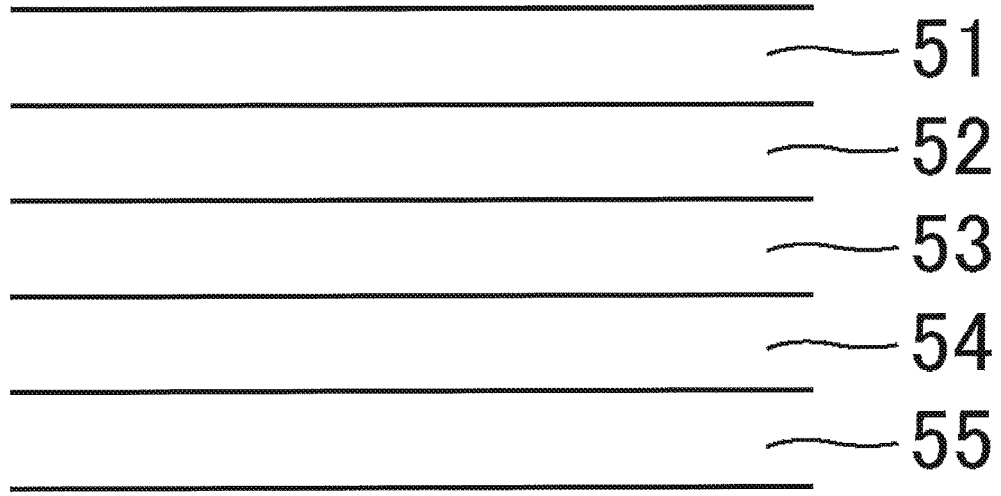
FIG. 3 shows still another example of the lamination structure including a coat formed from the composition of the present invention, and the sheet and the laminated sheet of the present invention.

In an embodiment shown in FIG. 3, an insulation layer 51, an optically clear adhesive sheet (OCA sheet) 52, a sheet 53 formed from the composition, a metal layer 54, and an insulation layer 55 are disposed in this order. The optically clear adhesive sheet (OCA sheet) 52 strongly bonds the insulation layer 51 and the sheet 53. The sheet 53 formed from the composition protect the metal layer 54 from corrosion and strongly bond the sheet 52 and the metal layer 54. The insulation layers 51 and 55 are preferably transparent substrates, and may be formed from glass, polyethylene terephthalate, a cycloolefin polymer, a polyimide polymer, a urethane polymer, an acrylic polymer, or a polymer mixture of a urethane polymer and an acrylic polymer. The metal layer 54 may be formed from copper, silver, aluminum, iron, SUS, nickel, molybdenum, chromium, or zinc, and preferably formed from copper or silver. The insulation layers 51 and 55 each may have a primer layer on one or both of the surfaces thereof so as to improve the adhesiveness. The primer layer may be a sheet formed from the composition of the present invention.

Figure 4:
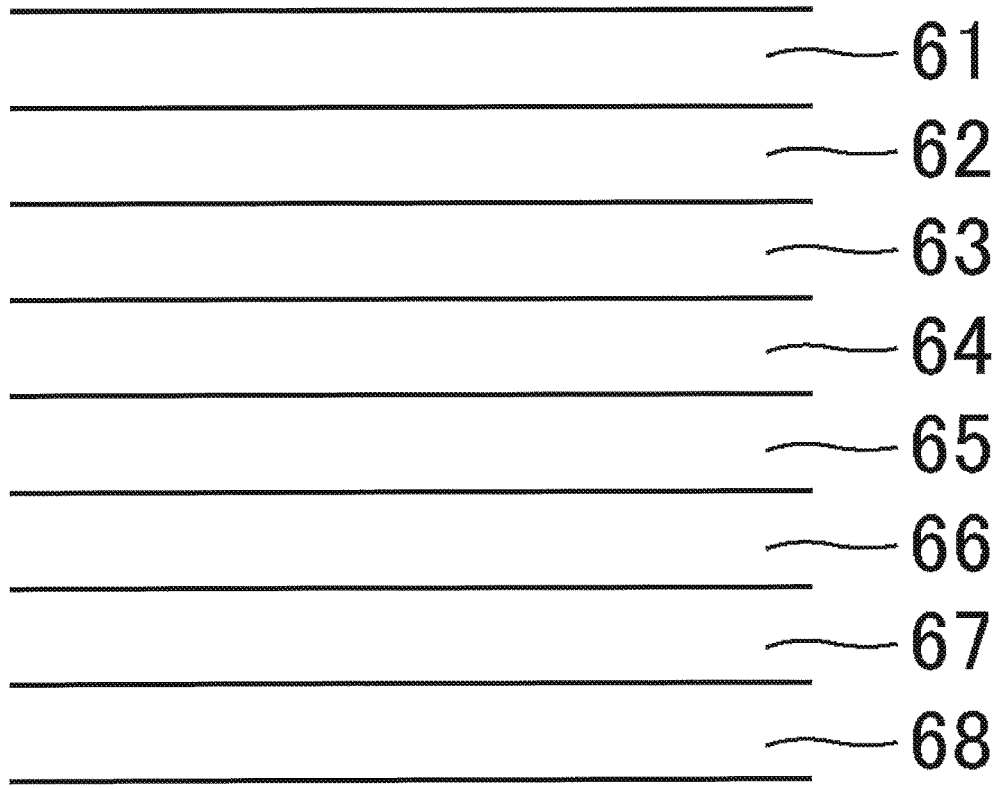
FIG. 4 shows still another example of the lamination structure including a coat formed from the composition of the present invention, and the sheet and the laminated sheet of the present invention.

In an embodiment shown in FIG. 4, an insulation layer 61, an optically clear adhesive sheet (OCA sheet) 62, a sheet 63 formed from the composition, a metal layer 64, an insulation layer 65, a metal layer 66, a sheet 67 formed from the composition, and an optically clear adhesive sheet (OCA sheet) 68 are disposed in this order. As shown here, two metal layers may be disposed with an insulation layer in between. The optically clear adhesive sheet (OCA sheet) 62 strongly bonds the insulation layer 61 and the sheet 63. Further, the laminate of the present embodiment may be bonded to another optical member with the optically clear adhesive sheet (OCA sheet) 68 in between. The sheets 63 and 67 formed from the composition protect the metal layers 64 and 66 from corrosion, strongly bond the sheet 62 and the metal layer 64, and strongly bond the metal layer 66 and the sheet 68. The insulation layers 61 and 65 are preferably transparent substrates, and may be formed from glass, polyethylene terephthalate, a cycloolefin polymer, a polyimide polymer, a urethane polymer, an acrylic polymer, or a polymer mixture of a urethane polymer and an acrylic polymer. The metal layers 64 and 66 may be formed from copper, silver, aluminum, iron, SUS, nickel, molybdenum, chromium, or zinc, and preferably formed from copper or silver. The insulation layers 61 and 65 each may have a primer layer on one or both of the surfaces thereof so as to improve the adhesiveness. The primer layer may be a sheet formed from the composition of the present invention.

The "sheet formed from the composition" in each embodiment as mentioned above may be a "coat formed from the composition". The optically clear adhesive sheets (OCA sheets) each may be a coat formed by applying an optically transparent pressure-sensitive adhesive (e.g., liquid optically transparent pressure-sensitive adhesive).

EXAMPLES

The present invention will be described referring to, but not limited to, examples.

The values in the examples were measured by the following methods.

(Haze Measurement)

Each of coating liquids prepared in Examples 1 to 6 and 10 to 19 and Comparative Examples 1 to 3 was applied to a PET film (Lumirror U-46, Toray Industries, Inc., 100 μm) using a bar No. 10, dried at 70° C. for 20 minutes, and then the dried coat was irradiated with UV (Ushio Inc., dose: 615 mJ/cm$^2$).

Each of coating liquids prepared in Examples 7 to 9 was applied to a PET film (Lumirror U-46, Toray Industries, Inc., 100 μm) using a bar No. 10, and then dried at 70° C. for one hour.

For each of the films formed on the PET, the haze value was measured using a haze meter (HazeGard II, Toyo Seiki Seisaku-sho, Ltd.).

(Copper Adhesiveness Test)

Each of the coating liquids prepared in Examples 1 to 6 and 10 to 19 and Comparative Examples 1 to 3 was applied to the copper-deposit surface of a film having a PET layer and a copper-deposit layer using a bar No. 10, and dried at 120° C. for five minutes. Then, the dried coat was irradiated with UV (Ushio Inc., dose: 615 mJ/cm$^2$), and thereby a copper substrate coated sample was obtained.

Each of coating liquids prepared in Examples 7 to 9 was applied to the copper-deposit surface of a film having a PET layer and a copper-deposit layer using a bar No. 10, and then dried at 120° C. for one hour. Thereby, a copper substrate coated sample was obtained.

Each coating formed on the copper-deposit surface of a film having a PET layer and a copper-deposit layer was subjected to the cross-cut test in conformity with JIS K5600, and the number of squares maintaining the adhesion was counted among 100 squares.

(Evaluation of Copper-Corrosion Prevention)

The same sample as the copper substrate coated sample prepared for the above adhesiveness test with a copper substrate was subjected to a high-temperature high-humidity test (85° C., 85% RH, 240 hours). The surface resistance of metal was determined using a non-contact type sheet resistance measurement instrument (EC-80P, Napson Corp.).

(Evaluation of Migration Prevention)

Each of the coating liquids prepared in Examples 1 to 6 and 10 to 19 and Comparative Examples 1 to 3 was applied to electrode portions of a comb-shaped copper electrode (L/S=300 μm/300 μm) and a comb-shaped silver electrode (L/S=300 μm/300 μm) using a bar No. 10, and dried at 120° C. for five minutes. Then, the dried coat was irradiated with UV (Ushio Inc., dose: 615 mJ/cm$^2$), and thereby a comb-shaped electrode coated sample was obtained.

Also, each of the coating liquids prepared in Examples 7 to 9 were applied thereto using a bar No. 10 and dried at 120° C. for five minutes. Thereby, a comb-shaped electrode coating sample was obtained. Conductive lines were soldered thereto, and then one drop of ultrapure water (18.2 MΩ/cm) was dropped to the coated portion and a DC voltage of 5 V was applied. The time (seconds) between the start of the voltage application and the start of a current flow (0.001 mA or higher) was measured. The cases where the current flow started within a time shorter than 40 seconds and thus a short circuit occurred were evaluated as poor; the cases where a short circuit occurred within a time not shorter than 40 seconds but shorter than 900 seconds as acceptable; and the cases where no short circuit occurred even after 900 seconds or longer as excellent.

Synthesis Example 1: Synthesis of Compound Having Unsaturated Group (Compounds a to f)

(Compound a)

A 30-mL recovery flask was charged with 1,2,3-benzotriazole (0.5 g) and acetone (10 g), and the components were stirred at room temperature for 30 minutes, so that the 1,2,3-benzotriazole was dissolved therein. Then, 0.59 g (1 equivalent to 1,2,3-benzotriazole) of 2-acryloyloxyethyl isocyanate (KarenzAOI, Showa Denko K.K.) was dropwise added thereto. The components were stirred at room temperature for four hours. A 0.1-g portion of the reaction solution was dropped to a KBr plate, and analyzed by Fourier transform infrared (FT-IR) spectrophotometry (FT-IR spectrophotometer Spectrum 100, Perkin Elmer precisely), thereby confirming that no isocyanate group derived from the acryloyloxyethyl isocyanate remained.

(Compound b, Compound d, and Compound f)

The reaction was allowed to proceed in the same manner as for Compound a such that an isocyanate monomer was used at 1 equivalent to a nitrogen-containing compound shown in Table 1.

(Compound c)

A 30-mL recovery flask was charged with 1,2,3-benzotriazole (0.5 g), acetone (10 g), and dibutyltin dilaurate (0.01 g), and the components were stirred at room temperature for 30 minutes, so that the 1,2,3-benzotriazole was dissolved therein. A condenser was attached thereto and the system was heated up to 70° C. using a water bath. Thereto was dropwise added 1,1-(bisacryloyloxymethyl)ethyl isocyanate (1.0 g), and the components were stirred at 70 degrees for 10 hours. Then, FT-IR analysis was performed in the same manner as for Compound a, thereby confirming that no isocyanate group remained.

(Compound e)

The reaction was allowed to proceed in the same manner as for Compound a except that an isocyanate monomer was used in 2 equivalents to a nitrogen-containing compound.

TABLE 1

Synthesis Example 1: Synthesis of compound having unsaturated group

| | Compound a | Equivalent amount | Compound b | Equivalent amount | Compound c | Equivalent amount | Compound d | Equivalent amount | Compound e | Equivalent amount | Compound f | Equivalent amount |
|---|---|---|---|---|---|---|---|---|---|---|---|---|
| Nitrogen-containing compound | BTA | 1 | BTA | 1 | BTA | 1 | OHB | 1 | OHB | 1 | TA | 1 |
| Isocyanate monomer | AOI | 1 | MOI | 1 | BEI | 1 | AOI | 1 | AOI | 2 | AOI | 1 |

BTA: 1,2,3-Benzotriazole
OHB: 4-Hydroxy-1H-benzotriazole
TA: 1,2,4-Triazole
AOI: 2-Acryloyloxyethyl isocyanate
MOI: 2-Methacryloyloxyethyl isocyanate
BEI: 1,1-(Bisacryloyloxymethyl)ethyl isocyanate

Synthesis Example 2: Polymerization Production of Fluoropolymer Having Cross-Linkable Functional Group (Polymers a to c)

(Polymer a)

A 6-L stainless-steel autoclave purged with nitrogen was charged with butyl acetate (1810 g). Next, vinyl versatate (C9) (VeoVa 9, Momentive Specialty Chemicals Inc.) (423.2 g), vinyl benzoate (160.6 g), 4-hydroxybutyl vinyl ether (113.6 g), and crotonic acid (4.4 g) were added thereto. Tetrafluoroethylene (TFE) (443.8 g) was further added thereto, and the temperature inside the tank was increased up to 60° C. Thereto was added perbutyl PV (radical polymerization initiator, NOF Corp.) (2.5 g) under stirring, and thereby the reaction was initiated. The pressure inside the tank was 0.8 MPa and the stirring rate was 280 rpm. Six hours after the start of the polymerization, the temperature inside the tank was increased up to 75° C. and stirring was continued for three hours. Then, the tank was returned to room temperature and normal pressure, so that the polymerization was terminated. Thereby, a solution of a fluorocopolymer in butyl acetate was obtained. Then, the solution was condensed using an evaporator until the polymer solids content reached 30 mass %.

(Polymer b)

A solution of a fluorocopolymer in butyl acetate was obtained in the same manner as for Polymer a except that 339.4 g of vinyl versatate (C10) (VeoVa 10, Momentive Specialty Chemicals Inc.), 194.8 g of 4-hydroxybutyl vinyl ether, 36.1 g of vinyl acetate, 3.0 g of crotonic acid, and 343.2 g of tetrafluoroethylene (TFE) were used.

(Polymer c)

A solution of a fluorocopolymer in butyl acetate was obtained in the same manner as for Polymer a except that 255 g of vinyl versatate (C9) (VeoVa 9, Momentive Specialty Chemicals Inc.), 80.6 g of 4-hydroxybutyl vinyl ether, 3.0 g of crotonic acid, and 300 g of chlorotrifluoroethylene (CTFE) were used.

TABLE 2

Formulation 1: Fluoropolymer having cross-linkable functional group

| | Polymer a | mol % | Polymer b | mol % | Polymer c | mol % |
|---|---|---|---|---|---|---|
| Polymer formulation | TFE/W9/VBz/HBVE/CA | 45.0/33.4/5.5/15.3/0.8 | TFE/W10/Vac/HBVE/CA | 45.0/24.5/6.0/24.0/0.5 | CTFE/W9/HBVE/CA | 58.0/27.5/13.8/0.7 |

TFE: Tetrafluoroethylene
CTFE: Chlorotrifluoroethylene
W9: Vinyl versatate (VeoVa 9, trade name of C9 aliphatic carboxylic acid vinyl ester of Momentive Specialty Chemicals Inc.)
W10: Vinyl versatate (VeoVa 10, trade name of C10 aliphatic carboxylic acid vinyl ester of Momentive Specialty Chemicals Inc.)
VB$_z$: Vinyl benzoate
Vac: Vinyl acetate
CA: Crotonic acid
HBVE: 4-Hydroxybutyl vinyl ether

Synthesis Example 3: Synthesis of Fluoropolymer Having Polymerizable Functional Group (Polymers d to g)

(Polymer d)

A 250-mL recovery flask was charged with a solution (100 parts by weight) of the fluorocopolymer (Polymer a) obtained in Synthesis Example 2 in butyl acetate, as well as ORGATIX TC750 (Matsumoto Fine Chemical Co., Ltd., Ti content: 11.2 wt %) (0.0005 parts by weight) and acryloyloxyethyl isocyanate (KarenzAOI, Showa Denko K.K.) (2.35 parts by weight), and the components were stirred under nitrogen atmosphere at 45° C. for six hours.

(Polymer e)

The reaction was allowed to proceed in the same manner as for Polymer d except that the fluorocopolymer (Polymer b) obtained in Synthesis Example 2 was used and 3.99 parts by weight of acryloyloxyethyl isocyanate (KarenzAOI, Showa Denko K.K.) was added.

(Polymer f)

The reaction was allowed to proceed in the same manner as for Polymer d except that the fluorocopolymer (Polymer c) obtained in Synthesis Example 2 was used and 2.17 parts by weight of acryloyloxyethyl isocyanate (KarenzAOI, Showa Denko K.K.) was added.

(Polymer g)

A 250-mL four-neck flask was charged with diethyl ether (80 mL), a homopolymer (5.0 g) of fluoro-(1,1,9,9-tetra-hydro-2,5-bistrifluoromethyl-3,6-dioxanonenol) represented by the following formula:

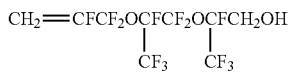

and pyridine (2.0 g), and the components were cooled down to 5° C. or lower with ice. Further, a solution of α-fluoro-acrylic acid fluoride (α-FA) (CH$_2$=CFCOF) (2.0 g) in diethyl ether (20 mL) was dropwise added thereto over about 30 minutes in a nitrogen stream under stirring. After the dropwise addition was completed, the temperature was increased up to room temperature and stirring was continued for 4.0 hours. The ether solution after the reaction was put into a separating funnel, and then repeatedly washed with water, 2% hydrochloric acid, a 5% NaCl aqueous solution, and water again. The washed solution was dried over anhydrous magnesium sulfate, and then the ether solution was separated by filtration. This ether solution was analyzed by $^{19}$F-NMR, and it was found to be a copolymer having a mole ratio represented by the following formula.

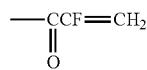

group-containing fluoroallyl ether/
OH group-containing fluoroallyl ether = 84/16 (mol%)

This ether solution was applied to a NaCl plate and formed into a cast film at room temperature. The resulting film was then IR-analyzed. The IR analysis found the absorption of carbon-carbon double bond at 1661 cm$^{-1}$ and the absorption of C=O at 1770 cm$^{-1}$.

Table 3 shows the acrylic components used in the examples.

TABLE 3

Formulation 3: Acrylic components

| | Acrylic component a | Acrylic component b | mass % | Acrylic component c | mass % |
|---|---|---|---|---|---|
| Polymer formulation | PMMA | MMA/TMPA | 50/50 | MMA/DPHA | 80/20 |

PMMA: Dianal BR-87, Mitsubishi Rayon Co., Ltd.
MMA: Methyl methacrylate
TMPA: Trimethylolpropane triacrylate
DPHA: Dipentaerythritol hexaacrylate Examples 1 to 6 and 10 to 19, and Comparative Examples 2 and 3

A compound having an unsaturated group, a polymerizable functional group-containing fluorine polymer, an acrylic component, butyl acetate, and methyl ethyl ketone were mixed and, if necessary, condensed, so that a coating liquid (butyl acetate/methyl ethyl ketone=1/1) having a concentration of 30% by mass and a formulation shown in Table 4 or 5 was prepared. Thereafter, Irgacure 184 (BASF) was added thereto so that the amount thereof was 3% by mass relative to the solids content (excluding the solvents, i.e., butyl acetate and methyl ethyl ketone) of the coating liquid to be obtained. Thereby, a coating liquid was prepared.

Examples 7 to 9

A compound having an unsaturated group, a cross-linkable functional group-containing fluorine polymer, an isocyanate curing agent, butyl acetate, and methyl ethyl ketone were mixed and, if necessary, condensed, so that a coating liquid (butyl acetate/methyl ethyl ketone=1/1) having a solids concentration of 30% by mass and a formulation shown in Table 4 was prepared.

Comparative Example 1

A compound having an unsaturated group alone was formed into a coating liquid (butyl acetate/methyl ethyl ketone=1/1) having a solids concentration of 30% by mass.

TABLE 4

| | | | Proportions in Examples (mass %) | | | | | |
|---|---|---|---|---|---|---|---|---|
| | | | Example 1 | Example 2 | Example 3 | Example 4 | Example 5 | Example 6 |
| Compound having unsaturated group | Compound a | BTA-AOI | 3 | | | | | |
| | Compound b | BTA-MOI | | 3 | | | | |
| | Compound c | BTA-BEI | | | 3 | | | |
| | Compound d | OHB-AOI | | | | 3 | | |
| | Compound e | OHB-2AOI | | | | | 3 | |
| | Compound f | TA-AOI | | | | | | 3 |
| Fluoropolymer having cross-linkable functional group | Polymer a | TFE-W9 | | | | | | |
| | Polymer b | TFE-W10 | | | | | | |
| | Polymer c | CTFE-W9 | | | | | | |
| Fluoropolymer having polymerizable functional group | Polymer d | TFE-W3-AOI | 97 | 97 | 97 | 97 | 97 | 97 |
| | Polymer e | TFE-W10-AOI | | | | | | |
| | Polymer f | CTFE-W9-AOI | | | | | | |
| | Polymer g | α-FA | | | | | | |
| Isocyanate curing agent | Curing agent a | N3300 | | | | | | |
| Acrylic component | Acrylic component a | PMMA | | | | | | |
| | Acrylic component b | MMA/TMPA | | | | | | |
| | Acrylic component c | MMA/DPHA | | | | | | |
| Evaluation of coating film | Thickness (μm) | | 10 | 10 | 10 | 10 | 10 | 10 |
| | Haze (%) | | 0.65 | 0.65 | 0.75 | 0.83 | 0.85 | 0.63 |

TABLE 4-continued

| | | | | | | | | |
|---|---|---|---|---|---|---|---|---|
| Copper adhesiveness | Cross-cut test | | 100/100 | 100/100 | 100/100 | 100/100 | 100/100 | 100/100 |
| Evaluation of copper-corrosion prevention | 85° C. 85% 240 h test | Change in resistance (%) | 0.8 | 1.0 | 0.9 | 1.5 | 1.2 | 0.9 |
| Evaluation of migration prevention | Copper | | Excellent | Excellent | Excellent | Excellent | Excellent | Excellent |
| | Silver | | Excellent | Excellent | Excellent | Excellent | Excellent | Excellent |

| | | | Proportions in Examples (mass %) | | | | |
|---|---|---|---|---|---|---|---|
| | | | Example 7 | Example 8 | Example 9 | Example 10 | Example 11 |
| Compound having unsaturated group | Compound a | BTA-AOI | 3 | 3 | 3 | 3 | 3 |
| | Compound b | BTA-MOI | | | | | |
| | Compound c | BTA-BEI | | | | | |
| | Compound d | OHB-AOI | | | | | |
| | Compound e | OHB-2AOI | | | | | |
| | Compound f | TA-AOI | | | | | |
| Fluoropolymer having cross-linkable functional group | Polymer a | TFE-W9 | 92 | | | | |
| | Polymer b | TFE-W10 | | 88 | | | |
| | Polymer c | CTFE-W9 | | | 93 | | |
| Fluoropolymer having polymerizable functional group | Polymer d | TFE-W3-AOI | | | | | |
| | Polymer e | TFE-W10-AOI | | | | 97 | |
| | Polymer f | CTFE-W9-AOI | | | | | 97 |
| | Polymer g | α-FA | | | | | |
| Isocyanate curing agent | Curing agent a | N3300 | 5 | 9 | 4 | | |
| Acrylic component | Acrylic component a | PMMA | | | | | |
| | Acrylic component b | MMA/TMPA | | | | | |
| | Acrylic component c | MMA/DPHA | | | | | |
| Evaluation of coating film | Thickness (μm) | | 10 | 10 | 10 | 10 | 10 |
| | Haze (%) | | 0.49 | 0.5 | 0.47 | 0.65 | 0.71 |
| Copper adhesiveness | Cross-cut test | | 100/100 | 100/100 | 100/100 | 100/100 | 100/100 |
| Evaluation of copper-corrosion prevention | 85° C. 85% 240 h test | Change in resistance (%) | 0.6 | 0.7 | 0.6 | 0.9 | 0.8 |
| Evaluation of migration prevention | Copper | | Excellent | Excellent | Excellent | Excellent | Excellent |
| | Silver | | Excellent | Excellent | Excellent | Excellent | Excellent |

Curing agent a: Sumidur N3300, Sumika Bayer Urethane Co., Ltd.

TABLE 5

| | | | Proportions in Examples (mass %) | | | | | |
|---|---|---|---|---|---|---|---|---|
| | | | Example 12 | Example 13 | Example 14 | Example 15 | Example 16 | Example 17 |
| Compound having unsaturated group | Compound a | BTA-AOI | 3 | 1 | 10 | 3 | 3 | 3 |
| | Compound b | BTA-MOI | | | | | | |
| | Compound c | BTA-BEI | | | | | | |
| | Compound d | OHB-AOI | | | | | | |
| | Compound e | OHB-2AOI | | | | | | |
| | Compound f | TA-AOI | | | | | | |
| Fluoropolymer having cross-linkable functional group | Polymer a | TFE-W9 | | | | | | |
| | Polymer b | TFE-W10 | | | | | | |
| | Polymer c | CTFE-W9 | | | | | | |
| Fluoropolymer having polymerizable functional group | Polymer d | TFE-W9-AOI | | 99 | 90 | 77 | 87 | 77 |
| | Polymer e | TFE-W10-AOI | | | | | | |
| | Polymer f | CTFE-W9-AOI | | | | | | |
| | Polymer g | α-FA | 97 | | | | | |
| Isocyanate curing agent | Curing agent a | N3300 | | | | | | |
| Acrylic component | Acrylic component a | PMMA | | | | 20 | | |
| | Acrylic component b | MMA/TMPA | | | | | 10 | |
| | Acrylic component c | MMA/DPHA | | | | | | 20 |
| Evaluation of coating film | Thickness (μm) | | 5 | 10 | 10 | 10 | 10 | 10 |
| | Haze (%) | | 0.1 | 0.65 | 0.65 | 0.9 | 0.65 | 0.67 |
| Copper adhesiveness | Cross-cut test | | 100/100 | 75/100 | 100/100 | 100/100 | 100/100 | 100/100 |
| Evaluation of copper-corrosion prevention | 85° C. 85% 240 h test | Change in resistance (%) | 0.8 | 4.7 | 0.7 | 0.7 | 1.1 | 0.9 |
| Evaluation of migration prevention | Copper | | Excellent | Acceptable | Excellent | Excellent | Excellent | Excellent |
| | Silver | | Excellent | Acceptable | Excellent | Excellent | Excellent | Excellent |

TABLE 5-continued

|  |  |  | Proportions in Examples (mass %) |  | Proportions in Comparative Examples (mass %) |  |  |
|---|---|---|---|---|---|---|---|
|  |  |  | Example 18 | Example 19 | Comparative Example 1 | Comparative Example 2 | Comparative Example 3 |
| Compound having unsaturated group | Compound a | BTA-AOI | 3 | 3 | 100 | BTA 3 | — |
|  | Compound b | BTA-MOI |  |  |  |  |  |
|  | Compound c | BTA-BEI |  |  |  |  |  |
|  | Compound d | OHB-AOI |  |  |  |  |  |
|  | Compound e | OHB-2AOI |  |  |  |  |  |
|  | Compound f | TA-AOI |  |  |  |  |  |
| Fluoropolymer having cross-linkable functional group | Polymer a | TFE-W9 |  |  |  |  |  |
|  | Polymer b | TFE-W10 |  |  |  |  |  |
|  | Polymer c | CTFE-W9 |  |  |  |  |  |
| Fluoropolymer having polymerizable functional group | Polymer d | TFE-W9-AOI | 58 | 77 | — | 97 | 100 |
|  | Polymer e | TFE-W10-AOI |  |  |  |  |  |
|  | Polymer f | CTFE-W9-AOI |  |  |  |  |  |
|  | Polymer g | α-FA |  |  |  |  |  |
| Isocyanate curing agent | Curing agent a | N3300 |  |  |  |  |  |
| Acrylic component | Acrylic component a | PMMA |  |  |  | — | — |
|  | Acrylic component b | MMA/TMPA | 39 |  |  |  |  |
|  | Acrylic component c | MMA/DPHA |  | 20 |  |  |  |
| Evaluation of coating film | Thickness (μm) |  | 10 | 10 | Unmeasurable | 10 | 10 |
|  | Haze (%) |  | 0.65 | 0.9 | Unmeasurable | 0.65 | 0.65 |
| Copper adhesiveness | Cross-cut test |  | 100/100 | 100/100 | 0/100 | 0/100 | 0/100 |
| Evaluation of copper-corrosion prevention | 85° C. 85% 240 h test | Change in resistance (%) | 1.2 | 1.5 | 1.6 | 3 | 14.7 |
| Evaluation of migration prevention | Copper |  | Excellent | Excellent | Excellent | Acceptable | Acceptable |
|  | Silver |  | Excellent | Excellent | Poor | Acceptable | Acceptable |

Curing agent a: Sumidur N3300, Sumika Bayer Urethane Co., Ltd.

REFERENCE SIGNS LIST

52, 62, 68: optically clear adhesive sheet (OCA sheet) or coat
22, 42, 46, 53, 63, 67: coat or sheet formed from composition

The invention claimed is:

1. A composition comprising:
   a fluoropolymer having at least one group selected from the group consisting of polymerizable functional groups and cross-linkable functional groups; and
   a nitrogen-containing aromatic heterocyclic compound having a polymerizable functional group,
   wherein the nitrogen-containing aromatic heterocyclic compound is a compound represented by the following formula (1) or the following formula (2):

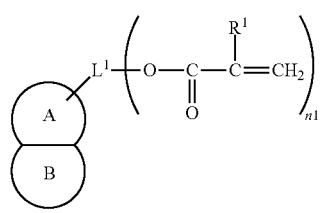
(1)

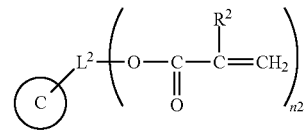
(2)

wherein the ring A represents a substituted or unsubstituted 5- or 6-membered nitrogen-containing aromatic heterocycle; $R^1$ represents a hydrogen atom, a halogen atom, or a $C_{1-6}$ alkyl group; n1 is an integer of 1 to 6; $L^1$ represents a linking group having a valency of n1+1 and having a bond represented by —CO—NH—, —CO—O—, —O—CO—NH—, or —NH—CO—NH—; and the ring B represents a substituted or unsubstituted aromatic ring, wherein the ring C represents a substituted or unsubstituted 5- or 6-membered nitrogen-containing aromatic heterocycle; $R^2$ represents a hydrogen atom, a halogen atom, or a $C_{1-6}$ alkyl group; n2 is an integer of 1 to 6; and $L^2$ represents a linking group having a valency of n2+1 and having a bond represented by —CO—NH—, —CO—O—, —O—CO—NH—, or —NH—CO—NH—.

2. The composition according to claim 1,
   wherein the fluoropolymer comprises a polymerization unit based on a monomer having at least one group selected from the group consisting of polymerizable functional groups and cross-linkable functional groups,
   the at least one group selected from the group consisting of polymerizable functional groups and cross-linkable functional groups is at least one selected from the group consisting of a carbon-carbon double bond, a hydroxy group (excluding the hydroxy group contained in a carboxyl group), a carboxyl group, and an amino group.

3. The composition according to claim 1,
   wherein, in the formula (1), the ring A is a 5-membered nitrogen-containing aromatic heterocycle having two or three nitrogen atoms.

4. The composition according to claim 1,
   wherein, in the formula (1), $L^1$ is represented by the following formula (3):

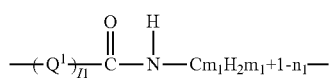
(3)

wherein $Q^1$ represents —O— or —NH—; l1 is 0 or 1; m1 is an integer of 1 to 20; and n1 is an integer of 1 to 6, if m1 is 1, n1 is an integer of 1 to 3, and if m1 is 2, n1 is an integer of 1 to 5.

5. The composition according to claim 1,
wherein, in the formula (1), the ring B is an aromatic ring substituted with a hydroxy group, an amino group, a carboxylic acid group, a nitro group, a halogen group, a thiol group, a cyano group, an acyl group, a sulfonic acid group, a mesyl group, an alkyl group, or a substituent represented by the following formula (4):

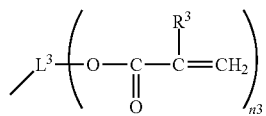
(4)

wherein $L^3$ represents a linking group having a valency of n3+1 and having a bond represented by —CO—NH—, —CO—O—, —O—CO—NH—, or —NH—CO—NH—; $R^3$ represents a hydrogen atom, a halogen atom, or a $C_{1-6}$ alkyl group; and n3 is an integer of 1 to 6.

6. The composition according to claim 1,
wherein, in the formula (1), the ring B is a benzene ring.

7. The composition according to claim 1,
wherein, in the formula (2), the ring C is a 5-membered nitrogen-containing aromatic heterocycle having two or three nitrogen atoms.

8. The composition according to claim 1,
wherein, in the formula (2), $L^2$ is represented by the following formula (5):

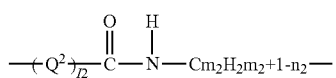
(5)

wherein $Q^2$ represents —O— or —NH—; l2 is 0 or 1; m2 is an integer of 1 to 20; and n2 is an integer of 1 to 6, if m2 is 1, n2 is an integer of 1 to 3, and if m2 is 2, n2 is an integer of 1 to 5.

9. The composition according to claim 1, further comprising an acrylic component (A).

10. The composition according to claim 1, which is a coating material.

11. The composition according to claim 1, which is an anti-corrosive coating material.

12. A coated article comprising:
a substrate; and
a coat formed from the composition according to claim 1 on the substrate.

13. The coated article according to claim 12,
wherein the substrate is formed from a metal.

14. A sheet formed from the composition according to claim 1.

15. A laminated sheet comprising
a release sheet, and
a sheet formed from the composition according to claim 1 on the release sheet.

* * * * *